United States Patent
San Martin et al.

(10) Patent No.: US 11,379,912 B2
(45) Date of Patent: Jul. 5, 2022

(54) REAL TIME DATA ALLOCATION

(71) Applicant: Raisin US Inc., New York, NY (US)

(72) Inventors: Iñigo San Martin, Brooklyn, NY (US); Paul Knodel, Jersey City, NJ (US); Michael Stephan, Berlin (DE)

(73) Assignee: Raisin US Inc., New York, NY (US)

( * ) Notice: Subject to any disclaimer, the term of this patent is extended or adjusted under 35 U.S.C. 154(b) by 0 days.

(21) Appl. No.: 17/477,933

(22) Filed: Sep. 17, 2021

(65) Prior Publication Data
US 2022/0005115 A1 Jan. 6, 2022

Related U.S. Application Data

(60) Provisional application No. 63/112,351, filed on Nov. 11, 2020.

(51) Int. Cl.
*G06Q 40/02* (2012.01)
*G06F 3/0482* (2013.01)
*G06F 9/451* (2018.01)

(52) U.S. Cl.
CPC ........ *G06Q 40/02* (2013.01); *G06F 3/0482* (2013.01); *G06F 9/451* (2018.02)

(58) Field of Classification Search
CPC .................................................. G06Q 40/02
See application file for complete search history.

(56) References Cited

U.S. PATENT DOCUMENTS

| | | | |
|---|---|---|---|
| 8,788,409 B1 * | 7/2014 | Souza | G06Q 20/40 705/39 |
| 10,268,995 B1 | 4/2019 | Zimmerman et al. | |
| 10,510,082 B1 | 12/2019 | Zimmerman et al. | |
| 10,657,504 B1 | 5/2020 | Zimmerman et al. | |
| 2011/0055079 A1 * | 3/2011 | Meaney | G06Q 20/102 705/40 |
| 2014/0279693 A1 * | 9/2014 | Roy | G06Q 40/06 705/36 R |
| 2016/0342967 A1 * | 11/2016 | Proctor | G06Q 20/108 |
| 2017/0243173 A1 * | 8/2017 | Witten | G07F 5/24 |
| 2017/0287074 A1 * | 10/2017 | Aber | G06Q 40/04 |
| 2020/0090148 A1 * | 3/2020 | Lawrence | G06Q 20/3221 |

* cited by examiner

*Primary Examiner* — Scott C Anderson
(74) *Attorney, Agent, or Firm* — Duane Morris LLP

(57) ABSTRACT

Account allocation and management systems and methods are described. A server generates an interactive web interface on a user device including an account creation tool having user input tools for creating a user-defined first account. The server continually monitors account condition data from among plural financial systems. The server determines a proposed combination including plural second accounts selected from among the financial systems, based on the monitored data and at least one user input indication, where the proposed combination includes optimized account characteristics. The proposed combination including a portion of the optimized characteristics are displayed on the interactive web interface. Responsive to a confirmation from the user device, the user-defined first account is created that includes the plural second accounts. The server, responsive to detecting a change in the monitored data, automatically rebalances one or more among the second accounts in accordance with the detected change.

30 Claims, 20 Drawing Sheets

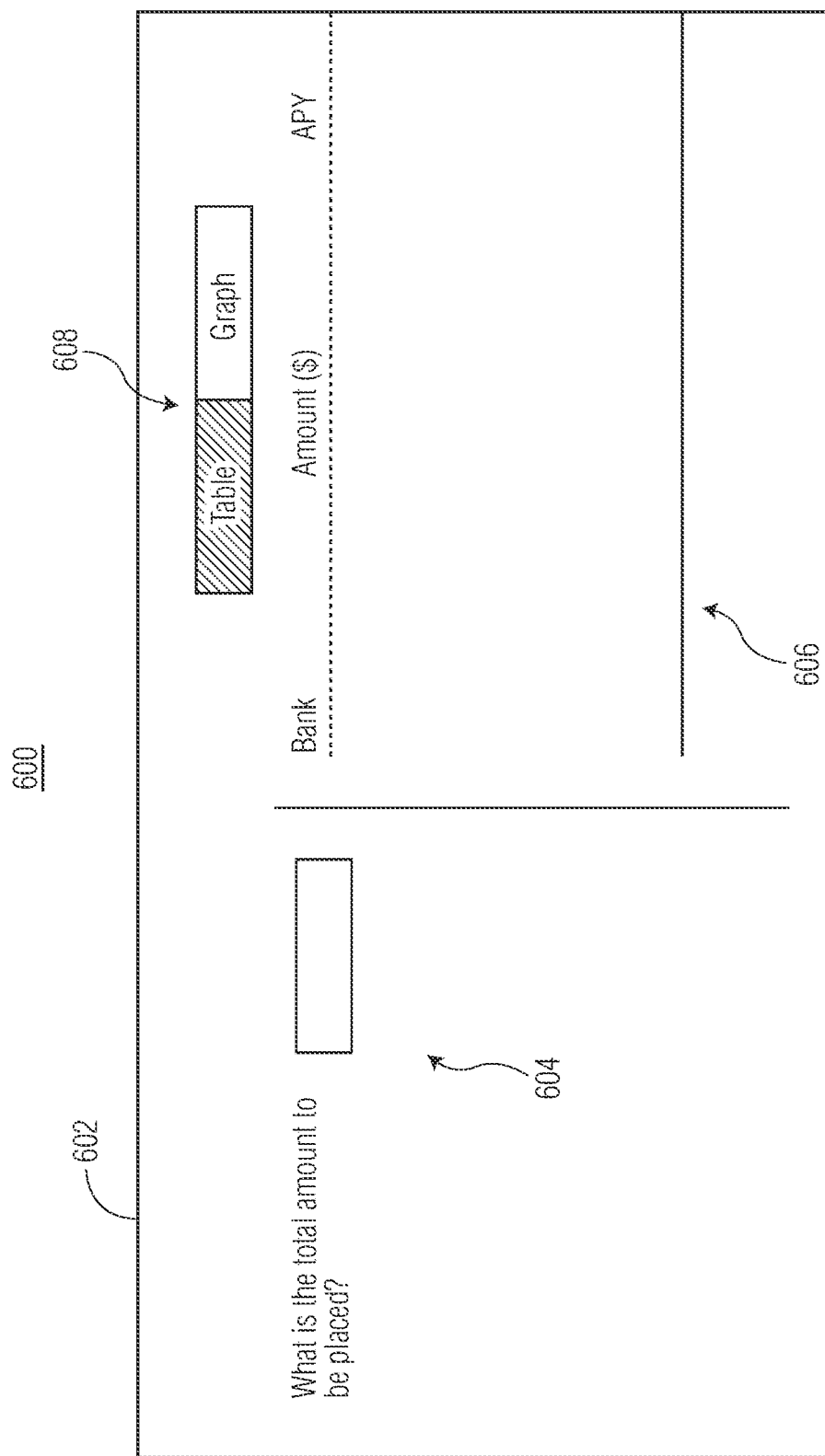

| CUSTOMER / ACCOUNTS ▼ |
|---|

Customer / Accounts / Open an Account

| 1. Customer Information ✓ | 2. Contact Information ✓ | 3. Funding and Payments ✓ | 4. Review × | 5. Documentation × |
|---|---|---|---|---|

ACCOUNT NUMBER: NOT ASSIGNED | STATUS: REQUEST NOT SAVED

[PREVIOUS] [NEXT]

| Bank Name | Amount | APY |
|---|---|---|
| Bank 1 | 245,000 | |
| Bank 2 | 245,000 | |
| Bank 3 | 245,000 | |
| Bank 4 | 245,000 | |
| Bank 5 | 245,000 | |
| Bank 6 | 245,000 | |
| Bank 7 | 245,000 | |
| Bank 8 | 245,000 | |
| Bank 9 | 245,000 | |
| Bank 10 | 245,000 | |
| Bank 11 | 245,000 | |

FIG. 7A

| Account # | Account Title | Start Date | Original Balance ($) | Current Balance ($) | APY | Accrued Interest ($) |
|---|---|---|---|---|---|---|
| ⊕ 123456 | Meta-Deposit | 07/19/20 | 5,000,000 | 5,000,000 | 1.06% | 0.00 |
| | Bank 1 | 03/12/20 | 245,000 | 245,000 | 1.35% | 0.00 |
| | Bank 2 | 03/12/20 | 245,000 | 245,000 | 1.30% | 0.00 |
| | Bank 3 | 03/12/20 | 245,000 | 245,000 | 1.25% | 0.00 |
| | Bank 4 | 03/12/20 | 245,000 | 245,000 | 1.25% | 0.00 |
| | Bank 5 | 03/12/20 | 245,000 | 245,000 | 0.85% | 0.00 |
| | Bank 6 | 03/12/20 | 245,000 | 245,000 | 1.20% | 0.00 |
| | Bank 7 | 03/12/20 | 245,000 | 245,000 | 1.15% | 0.00 |

Related Functions
Details
Holds
Early withdrawals
Statements

All interest rates shown in client and advisor screens are net of any revenue for all parties involved What is the maximum revenue for your institution?
*(expressed in upfront terms per year of duration applied to the initial total amount)*

0.15%

Click here if revenue is different depending on tenor

Is the relationship manager allowed to keep a portion of the revenue charged by your institution?

| Yes | No |

832

What is the maximum discount the relationship manager can give to the client 0.05%

FIG. 8D

| Account # | Opening Date | Outstanding ($) | Remaining Capacity ($) | Current APY | YTD Accrued Interest ($) |
|---|---|---|---|---|---|
| Various ⊕ | Various | 2,456,865 | 2,543,135 | 1.00% | 24,345 |

FIG. 9B

| Account # | Opening Date | Outstanding ($) | Remaining Capacity ($) | Current APY | YTD Accrued Interest ($) |
|---|---|---|---|---|---|
| ⊖ Various | Various | 2,456,865 | 2,543,135 | 1.00% | 24,345 |
| 0000001 | 06/05/2019 | 246,225 | 3,775 | 1.00% | 24,345 |
| 0000025 | 06/08/2019 | 246,203 | 3,780 | 1.00% | 24,345 |
| 0000034 | 06/12/2019 | 246,111 | 3,889 | 1.00% | 24,345 |
| 0000057 | 07/23/2019 | 245,543 | 4,457 | 1.00% | 24,345 |
| 0000072 | 08/11/2019 | 245,234 | 4,766 | 1.00% | 24,345 |

FIG. 9C

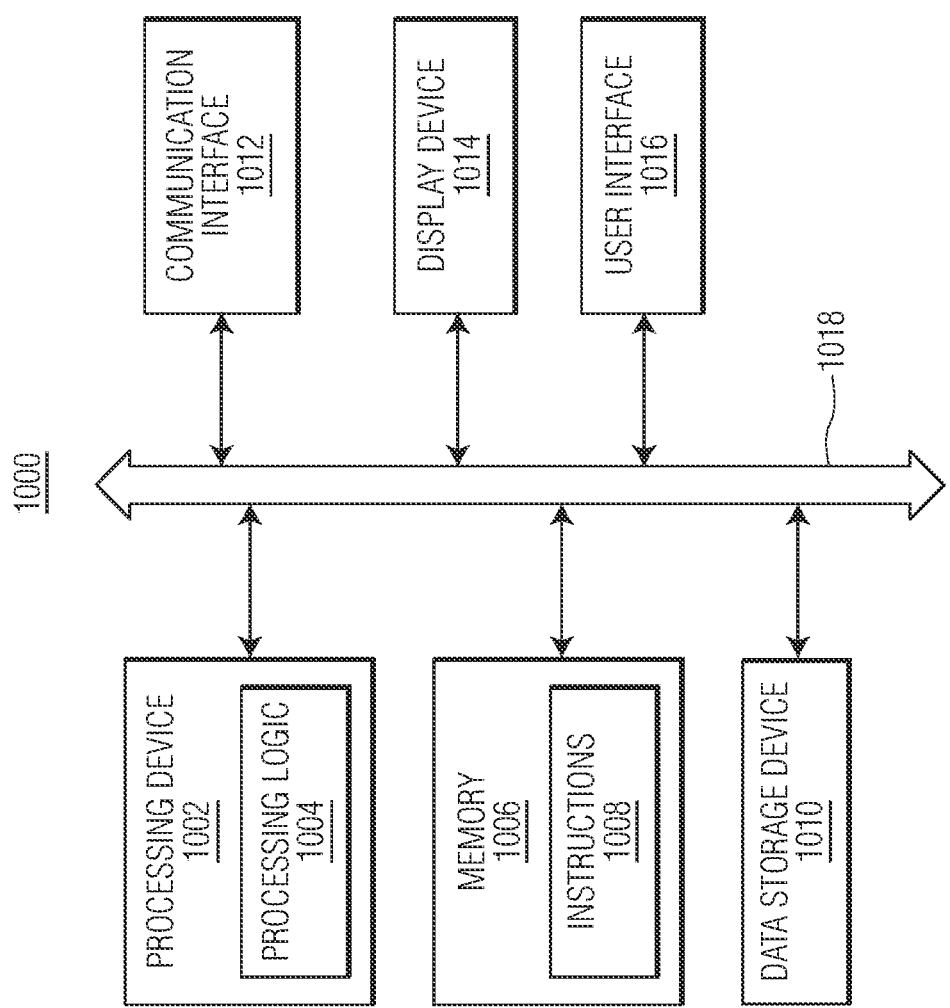

REAL TIME DATA ALLOCATION

TECHNICAL FIELD

The present disclosure relates generally to handling of electronic data and, more particularly, to the instantaneous creation of demand deposit accounts and the real time allocation and adjustment of electronic funds in such demand deposit accounts of multiple financial institutions.

BACKGROUND

Systemic problems exist in the field of electronic data account management. In particular, challenges exist in the handling (e.g., creation, electronic funding, allocation, management, modification, customization, etc.) of electronic data accounts, particularly for electronic data accounts associated with multiple financial institutions. For example, different financial institutions may have different computer system configurations and may perform different technical operations including in data handling (e.g., internal account management procedures, various thresholds and/or conditions (which may be proprietary) for funding and management, etc.), data storage (e.g., secure storage protocols, database architectures, etc.), data transfer (e.g., security protocols, transmission protocols, data pushing and/or data pulling, the use of data feeds, etc.), data formatting (e.g., proprietary, open source, compressed, character encoding, file formats, etc.) and data distribution (via data feeds, distribution platforms, web portals, client applications, etc.) to various end users. Still further, various conventional systems may only permit very limited, if any, ability for customization of data account. The above number of possible variations in technical operations and customization makes it particularly challenging from a computer system perspective to manage different independent accounts associated with multiple financial instruments, let alone to perform such management in real-time.

Moreover, in conventional systems, funding of data accounts may involve various types of user input including, for example, email, text messaging, online chatting, telephone calls, paper forms and/or any combination thereof, and may also involve the further review of an administrator. In addition, the funding process itself may be opaque, with thresholds and/or conditions (in some cases proprietary) not being known ahead of time. Further, the conventional funding process is generally not performed in real-time, with funding typically taking several days to be entered into an electronic account. This is due, at least in part, to the lack of real-time technology of existing systems. Instead, existing systems rely on antiquated technologies (e.g., automated clearing house (ACH)) that are incapable of real-time data gathering, determinations and output.

Accordingly, it would be desirable to have systems and methods for facilitating real-time placement of electronic funds in electronic demand deposit accounts created instantaneously at multiple insured financial institutions. Moreover, it would be desirable to have systems, methods and computer programs for dynamically pricing and automatically managing user-defined electronic meta-deposit accounts throughout their entire life cycle, in a viable and systematically-efficient manner.

SUMMARY

Aspects of the present disclosure relate to systems, methods and non-transitory computer-readable mediums providing electronic account allocation and management. A system includes a plurality of financial entity systems, at least one user device and at least one computer server configured to communicate with the plurality of financial entity systems and the at least one user device via at least one communication network. The at least one computer server is configured to generate an interactive web interface on a display of the at least one user device. The interactive web interface comprises one or more screens configured to display an account creation tool including one or more user input tools for creating a user-defined first electronic account. The at least one computer server is also configured to receive, from the at least one user device via the interactive web interface, at least one user input indication via the one or more user input tools and continually monitor, by a data monitor of the at least one computer server, account condition data from among the plurality of financial entity systems. The at least one computer sever is further configured to determine, via an optimization engine of the at least one computer server, a proposed combination comprising a plurality of second electronic accounts selected from among the plurality of financial entity systems, based on the monitored account condition data and the at least one user input indication, where the proposed combination comprises one or more optimized account characteristics. The at least one computer server is further configured to: display, via the interactive web interface, on the account creation tool, the proposed combination including at least a portion of the optimized account characteristics; receive, from the at least one user device via the interactive web interface, input comprising a confirmation indication; create, via the optimization engine, the user-defined first electronic account comprising the plurality of second electronic accounts, responsive to the confirmation indication; and responsive to detecting a change in the monitored account condition data among the plurality of financial entity systems, automatically rebalance, by the optimization engine, one or more accounts among the plurality of second electronic accounts in accordance with the detected change.

BRIEF DESCRIPTION OF THE DRAWINGS

FIGS. 6A, 6B, 6C, 6D and 6E are example screenshots of an interactive GUI for dynamically creating user-customized meta-deposit account(s), according to aspects of the present disclosure.

FIGS. 7A and 7B are example screenshots of an interactive GUI for dynamically creating user-customized meta-deposit account(s), according to aspects of the present disclosure.

FIGS. 8A, 8B, 8C and 8D are example screenshots of an interactive GUI for dynamically managing user-customized meta-deposit account(s), according to aspects of the present disclosure.

FIGS. 9A, 9B and 9C are example screenshots of an interactive console GUI, according to aspects of the present disclosure.

FIG. 10 is a functional block diagram of an example computer system according to an aspect of the present disclosure.

DETAILED DESCRIPTION

Figure 1:
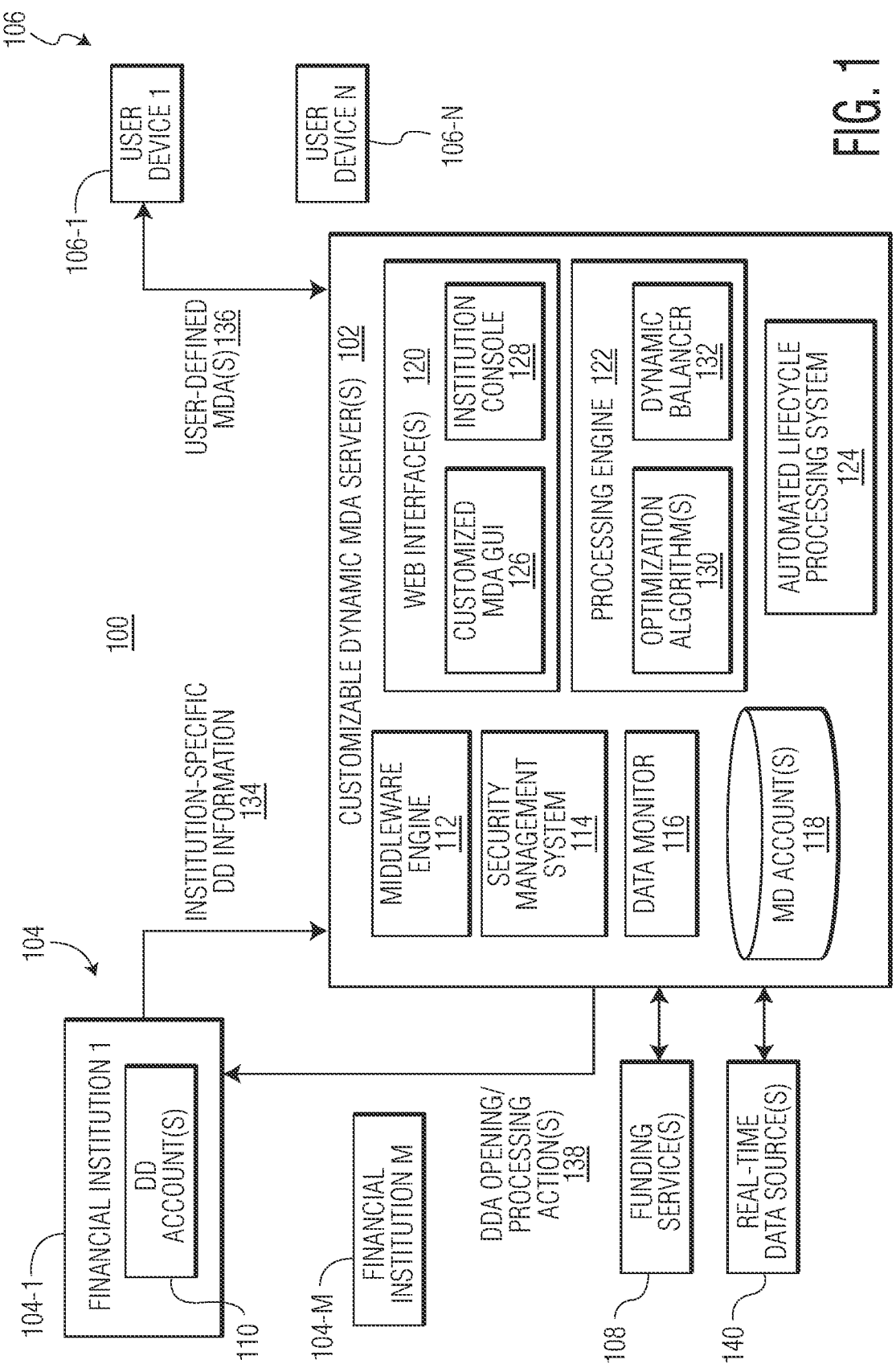
FIG. 1 is a functional block diagram of an example real-time data account allocation and management system, according to an aspect of the present disclosure.

The present disclosure relates generally to system components, processes and computer programs for creating and managing, in real time, user-defined electronic meta-deposit accounts comprising any number of demand deposit accounts associated with one or more insured financial institution systems. Aspects of the present disclosure includes facilitating real-time placement of electronic funds in electronic demand deposit accounts that may be created instantaneously at multiple insured financial institutions. Aspects of the present disclosure also relate to dynamically pricing and automatically managing user-defined electronic meta-deposit accounts throughout the lifecycles of the meta-deposit accounts.

In an exemplary implementation, the present disclosure may be utilized in the realm of electronic deposits at financial institutions. In the context of this particular technological environment, problems of conventional electronic deposit allocation/management systems are described below.

Government insurance of deposits at financial institutions (FDIC and NCUA) have dollar amount limits that generally do not meet the needs of people and institutions. By allocating a (predefined) total dollar amount that a person or an institution may hold in cash into multiple financial institutions, that amount becomes eligible to be covered by government insurance in full. This process is referred to as a 'cash sweep'. Existing allocation/management methods and systems for achieving the ultimate objective of a cash sweep generally rely on batch files, wire transfers, auctions, and custodians, resulting in a solution that has multiple problems.

One (general) problem with existing methods is that these methods are primarily manual, with emails, telephone calls and even paper forms usually being involved in the process. In addition, conventional methods are generally opaque (e.g., lack transparency). This lack of transparency may detract from an attractiveness of the process for both deposit placers (e.g., people and/or institutions) and deposit takers (e.g., financial institutions). For deposit placers, the total amount placed, the institutions in which the deposit has been placed and the interest rate(s) (which may be associated with the selected institutions) are typically not known until an auction has occurred. For deposit takers, the amount of deposits that has been allocated to them and the prices are typically not known until the auction has occurred.

More significant problems lie in the technological deficiencies of existing systems associated with such processes. For example, existing technologies are static. That is, once electronic funds are allocated and deposited, there is no mechanism for changing the allocations so as to account for changing market conditions, for example (e.g., price volatility). This is caused by (among other things) a lack of technology for operating in real-time. Indeed, once electronic funds are sent by deposit placers to deposit taker systems, it generally takes several days for the funds to be accepted by deposit taker systems. During this time, external conditions can (and often do) change, thereby rendering the existing deposit allocation sub-optimal. As discussed above, existing systems rely on antiquated technologies such as ACH, which are inherently flawed and lack the ability to perform any type of real-time data gathering (i.e., to connect to and/or extract live data from real-time data sources), to make real-time determinations, to generate real-time output, etc.

The present disclosure, on the other hand, has developed new real-time electronic data account allocation and management systems (also referred to herein as real-time account allocation/management (AAM) systems or AAM systems) and methods that solve the technical problems noted above that currently exist in conventional systems.

Importantly, the AAM system of the present disclosure comprises a technical arrangement of computer components and processes that, together, form a new system architecture that brings real-time technology to this field for the first time. Indeed, the real-time AAM system is configured to interface with and have live connectivity with real-time data sources, perform real-time data monitoring (gathering) across multiple data sources, create user-customizable meta-deposit (MD) accounts (or "MDAs"), automatically select financial institutions for creating one or more electronic demand deposit (DD) accounts and continually optimize parameters for the DD account(s) (of an MD account) according to the most current (up-to-date) information, and provide real-time placement of electronic funds in the optimized electronic demand deposit accounts (that may be created instantaneously) at multiple insured financial institutions. In addition, the AAM system is configured to dynamically price and update the (user-defined) MD accounts in accordance with real-time changes in the monitored data, and automatically manage (and continually optimize) the MD accounts throughout the lifecycles of the MD accounts.

The real-time technology and processes of the AAM system completely eliminate the delays that currently exist in conventional systems between the request by deposit placers to the actual funding by deposit takers, and it provides the ability to continually update and optimize deposit allocations (e.g., based on fluctuations in live market data) across any number of institutions in real-time. Further, the AAM system of the present disclosure includes an interactive graphical user interface (GUI) that provides users with the ability to create a user-customizable MD account, view the selection and allocation of electronic funds of proposed DD accounts across financial institutions (as automatically optimized by the AAM system), approve and/or modify the system-optimized selections and view changes to the MD account over its lifecycle (including changes based on dynamic pricing). In this manner, the AAM system solves technological issues that currently exist in conventional systems, and brings advanced technological functionality to antiquate systems. Yet further, the architecture of the AAM system in combination with the specialized routines performed AAM system significantly reduces system latency, manual errors, and other deficiencies that currently exist in conventional systems.

In some examples, the AAM system of the present disclosure may include an interactive GUI, a processing engine (e.g., an optimization engine), a real-time data monitor and an automated lifecycle processing system. The interactive GUI may be configured to create user-customizable MD accounts having one or more user-defined characteristics. Each (customized) MD account may comprise one or more demand deposit (DD) accounts associated with one or more insured financial institutions. The processing engine may be configured to automatically select a combination of various financial institutions in which to create the DD account(s) and optimize parameters of the (to be created) DD account(s). In some examples, the processing engine may be configured to determine, select and/or update, in real-time, an optimized combination of (to be created) DD accounts at different insured financial institutions and an optimized deposit allocation across the DD accounts, based on user-defined characteristics for the (desired) MD account and/or on monitored real-time data (e.g., the most up-to-date information associated with the financial institutions (via the real-time data monitor)). The processing engine may also be configured to provide real-time placement (and reallocation) of electronic funds in the DD accounts of the financial institutions, and may also provide dynamic pricing of the MD account in accordance with changes to the monitored real-time data (via the real-time data monitor) over the lifecycle of the user-defined MD account. The automated lifecycle processing system may be configured perform one or more MD account processing routines over the MD account lifecycle. The interactive GUI may also be configured to provide real-time and/or historic information of the MD and/or DD accounts to the user over the MD account lifecycle.

In some examples, various insured financial institutions may provide demand deposit account condition data to the AAM system. The demand deposit account condition data may be associated with creating and/or managing DD account(s) for a particular insured financial institution. In some examples, the account condition data may be specific (e.g., unique) to each financial institution. In a non-limiting example, the account condition data may include one or more of at least one annual percentage yield (APY) for demand deposit accounts, a total maximum amount an institution may be willing to accept in demand deposit accounts for a specific program (associated with a particular institution) and a minimum amount an institution may be willing to accept from a single depositor for a specific program. In some examples, the AAM system may determine a suitable configuration of DD accounts for a user-customized MD account based on the account condition data among multiple insured financial institutions.

According to aspects of the present disclosure, a user (e.g., a depositor) may (directly or indirectly through an advisor, for example) access a visual web interface and may input a total amount desired to be placed in one or more (including multiple) financial institutions, in order to create a user-defined electronic MD account, consisting in turn, of multiple demand deposit accounts at one or multiple insured financial institutions, so that the total amount (in the MD account) is FDIC insured. Based on the user input, an optimization algorithm of the present disclosure may be configured to determine (e.g., select) and present, in real time (e.g., based on monitored real-time market data) and via the visual web interface, an optimal combination of electronic DD accounts at different insured financial institutions, including an amount to be placed at each institution (i.e., an optimal deposit allocation). In some examples, a blended APY (e.g., for all of the selected financial institutions) may be shown, without presenting individual APYs by the (individual) insured financial institutions, therefore avoiding undesired pre-purchase price discovery.

According to aspects of the present disclosure, the user (e.g., the depositor) may be provided options (via the visual web interface). One non-limiting example of options may include limiting and/or excluding (de-selecting) any optimization algorithm-selected insured financial institution for the demand deposit accounts. In some examples, responsive to user input to exclude an institution, the optimization algorithm as described herein may automatically select a next optimal insured financial institution to be included for the demand deposit account(s). Another non-limiting example of options may include altering to-be-deposited amounts at each algorithm-selected insured financial institution.

Once the combination of demand deposit accounts at each of the insured financial institutions satisfies the requirements of the depositor, the AAM system may create a user-defined meta-deposit account that comprises the combination of demand deposit accounts. A single account opening process for the user-defined meta-deposit account may be invoked by the AAM system, according to aspects of the present disclosure. At the end of the single account opening process, one or more electronic demand deposit accounts may be created at each of the (selected) insured financial institutions. The accounts may be funded by the depositor in real time through the use of one or more services (e.g., sufficient fund verification, real time cash movement . . . etc.) provided, for example, by one or more third parties.

Aspects of the present disclosure may also include managing one or more user-defined electronic meta-deposit accounts. For example, once opened and funded, a user-defined meta-deposit account may be managed through a web interface of the AAM system by a user. Among others, available actions provided through the web interface may include (without being limited to) user input options to withdraw all or a portion of the original balance (e.g., subject to maximum monthly penalty free withdrawals) and user input options to add funds to the meta-deposit account. Responsive to user input to add funds, the optimization algorithm may present a newly-optimized (e.g., best) allocation at one or multiple insured financial institution for the additional funds.

Unlike some accounts (e.g., time deposit accounts), the APY in demand deposit accounts may change at any point in time. This means that an original optimal allocation may (and likely will) change such that it is no longer be optimal (e.g., if a given insured financial institution reduces a respective APY on a corresponding demand deposit account in the program responsive to changing market conditions). Aspects of the present disclosure include techniques to adjust the combination of electronic demand deposit accounts (which make up a user-defined meta-deposit account) responsive to changes in any APY value across the financial institutions. For example, once a rate change occurs, the optimization algorithm described herein may recalculate the optimal combination of demand deposit accounts at the different insured financial institutions. Subject to a predefined rebalancing threshold (and in some examples a provided depositor opt-in indication), the optimization algorithm may automatically adjust (re-optimize) the balances across the financial institutions accordingly (e.g., may reduce balance(s) placed in one or more insured deposit institutions and may increase balance(s) in others among the one or more insured deposit institutions).

In some examples, different interest rates (e.g., tiered interest rates) may be applicable depending on a size of the deposit amount in any particular DD account. As a result, a withdrawal of funds from the DD account, a transfer of funds among one or more DD accounts and/or an addition of funds to the DD account may trigger the optimization algorithm of the present disclosure to re-calculate one or more interest rates (associated with the user's DD accounts) for which the user now qualifies, as part of the re-optimization process. For example, a deposit amount of $300,000 for any given DD account may qualify for a 3% interest rate. Thus, if a user has an MD account comprised of DD accounts A-C, and the user's DD account A has $300,000, that account earns 3% in interest. After withdrawal of $100,000 from the user's DD account A, the optimization algorithm may automatically adjust the balances across the user's MD account (e.g., DD accounts A-C) taking into consideration a new interest rate of 2% that is now applicable to the $200,000 remaining in DD account A. In this manner, the user's MD account remains optimized in terms of interest rate earned.

In some examples, insured financial institutions may have access to a console of the AAM system of the present disclosure, where the offered APY may be inputted. The console may be fed (e.g., manually and/or electronically) through an application programming interface (API). Contractually, the APY in a demand deposit account may change at any time, resulting in increases or decreases in accrued interest as of the time of the APY change. The optimal combination of demand deposit accounts at inception may become suboptimal as soon an APY of one insured financial institution changes.

Accordingly, the optimization algorithm of the present disclosure may be configured to monitor all current meta-deposit accounts (e.g., combinations of DD accounts at the different insured financial institutions), live market data including all APY changes by all insured financial institutions, a total/relative change of such APY changes and any exclusions for each platform user. With the above information, assuming a certain materiality threshold that is dependent on an interest rate environment, the optimization algorithm may determine a new optimal allocation of electronic funds amount among all participating insured financial institutions. In some examples, the new optimal allocation may be electronically presented to a user (e.g., a depositor) for approval before any allocation changes and/or may be automatically selected by the optimization algorithm (e.g., if permission from the user was previously granted to do so) and executed. In some examples, optimal combinations may be constantly calculated for each user (by the optimization algorithm), and may be presented via a GUI or excluded from being presented (for example, depending on a materiality of possible yield improvement).

The system of the present disclosure, in some examples, may both manage the complete lifecycle processing of each demand deposit account on behalf of the respective financial institution, and also originate and create the DD accounts. Non-limiting examples of lifecycle (e.g., downstream) processing functions by the system may include one or more of interest accruals, settlements, general ledger (GL) entries, tax form processing and statement generation.

In some examples, a computer program of the present disclosure may be configured as a processing (optimization) engine for all of the electronic demand deposit accounts at each of the insured financial institutions. In some examples, electronic files may be made available for the insured financial institutions' core banking system to consolidate and reconcile records.

Referring now to FIG. 1, a functional block diagram of an example real-time account allocation and management (AAM) system 100 for creating and managing user-defined meta-deposit accounts (MDAs) according to the present disclosure is shown. System 100 may include at least one customizable dynamic MDA server 102 (also referred to as MDA server(s) 102 herein), one or more financial institutions 104-1, . . . , 104-M (designated generally as financial institution (s) 104, where M is greater than or equal to 1), one or more user devices 106-1, . . . , 106-N (designated generally as user device(s) 106, where N is greater than or equal to 1, and where M may or not be equal to N) and, in some examples, one or more funding service(s) 108. In some examples, system 100 may include one or more real-time data sources 140 (e.g., source(s) of live market data or other real-time information). Although not shown, MDA server(s) 102, financial institution(s) 104, user device(s) 106 and funding service(s) 108 may be communicatively coupled via one or more communication (e.g., wired and/or wireless) networks. The one or more networks may include, for example, a private network (e.g., a local area network (LAN), a wide area network (WAN), intranet, etc.) and/or a public network (e.g., the Internet).

In summary, MDA server(s) 102 may be configured to communicate with financial institution(s) 104 to obtain (and continually monitor) institute-specific DD information 134 associated with opening and/or maintaining DD account(s) (DDAs) 110 (also referred to herein as DD account(s) 110) from among financial institution(s) 104. MDA server(s) 102 may also be configured to communicate with user device(s) 106 via one or more web interface(s) 120, in order to create at least one user-defined MDA 136. As described further below, at least one user-defined MDA 136 may be created that comprises a configuration of one or more DDAs 110 associated with a combination of financial institutions 104 (e.g., one or more financial institutions).

Processing engine 122 of MDA server(s) may automatically select the configuration of DDA(s) 110 to be opened (including an amount to be funded for each DDA 110) in accordance with one or more optimization algorithms 130. The optimized configuration of DDAs may be based on one or more user-defined parameters for MDA 136 as well as monitored real-time data and/or institution-specific DD information 134 associated with each financial institution 104.

MDA server(s) 102 may further be configured to manage user-defined MDA(s) 136 over their entire lifecycle (via automated lifecycle processing system 124), and may communicate any opening and/or processing DDA processing action(s) 138 for one or more DDA(s) 110 to a corresponding financial institution among financial institution(s) 104. DDA opening/processing action(s) 138 may include any processing actions for execution by one or more of financial institution (s) 104 (e.g., opening DDA(s) 110, updating records, additional processing, updates to DDA(s) 110, etc.) based on any events associated with the lifecycle of user-defined MDA(s) 136.

Moreover, because MDA(s) 136 rely on underlying data that may change over time (including volatile data), processing engine 122 of MDA server, in combination with continual data monitoring by data monitor 116, may automatically ensure that information provided to user device(s) 106 and account information of MDA(s) 136/DDA(s) 110 (e.g., during an MDA creation process, an MDA/DDA opening process and over a lifecycle of MDA(s) 136) is dynamically updated (including in real-time and/or near real-time) in accordance with changes to the monitored data. Importantly, dynamic balancer 132 of processing engine 122 may dynamically (e.g., automatically) price MDA(s) 136

(which may include dynamically repricing one or more of the corresponding DDA(S) 110 of selected financial institutions 104) in accordance with changes to the monitored data (including in real-time and/or near real-time), over the lifecycle of MDA(s) 136.

Financial institution(s) 104 may comprise a server computer, a desktop computer, a laptop or any other computing device configured to create and manage one or more DDA(s) 110 (e.g., by the specific financial institution itself) and to capture, receive, store and/or disseminate any suitable institution-specific DD information(s) 134 associated with DDAs 110. In some examples, institution-specific DD information 134 may include DD account condition data associated with opening and/or managing DDA(S) 110 and/or account information for (opened) DDA(s) 110. In a non-limiting example, the DD account condition data may include one or more of at least one APY for DDAs 110, a total maximum amount an institution may be willing to accept in DDAs 110 for a specific program (associated with a particular institution) and a minimum amount an institution may be willing to accept from a single depositor for a specific program. In some examples, financial institution(s) 106 may be configured for communication with web interface(s) 120, such as for communicating with customized MDA GUI 126 and/or institution console 128.

In some examples, financial institution(s) 104 may include a computing device configured to employ an internet browser for secured connections via a wired and/or wireless communications network to centrally hosted and managed MDA server(s) 102. In some examples, financial institution (s) 104 may include a single entity system (e.g., financial institution 104-1) and MDA server(s) 102 may be configured for in-house deployment including for physical and /or virtual machine configurations. In some examples, financial institution (s) 104 may include one entity system (e.g., financial institution 104-1) configured as a cloud computing environment, including, in some examples, as Infrastructure as a Service (IaaS) and/or Platform as a Service (PaaS) cloud services. In some examples, financial institution(s) 104 may include multiple (e.g., M>1) entity systems, configured as a multi-entity platform deployment. In some examples, the multi-entity platform may include IaaS and/or PaaS configurations.

User device(s) 106 may comprise a server computer, a desktop computer, a laptop, a smartphone, tablet, or any other computing device known in the art configured to capture, receive, store and/or disseminate any suitable data. User device(s) 106 may include a display device, a user interface and a communication interface (e.g., a web browser) for communication with web interface(s) 120. The user interface and the display may be one component (e.g., a touchscreen display), may be separate components (e.g., a display and a pointing device) and or any combination thereof. In some examples, user device(s) 106 may include an in-house terminal located within financial institution(s) 104. In some examples, user device(s) 106 may include remote devices not associated with financial institution(s) 104 (e.g., a user's smartphone). In some examples, user device(s) 106 may include a client application for communication with web interface(s) 120, such as a client application for communicating with customized MDA GUI 126.

Funding service(s) 108 may comprise a server computer, a desktop computer, a laptop or any other computing device configured to fund DDA(s) 110. MDA server(s) 102 may be configured to communicate with funding service(s) 108 as part of an opening process for opening DDA(s) 110 of (created) user-defined MDA(s) 136. In some examples, funding service(s) 108 may also communicate directly with one or more of financial institution(s) 104 to electronically fund DDA(s) 110. Funding service(s) 108 may include any suitable functions for finding DDA(s) 110 such as verification of sufficient funding, real-time cash movement and the like.

It may be appreciated that the techniques described herein for dynamically creating and managing MDA(s) 136 may be applied to data accounts associated with other technical fields (aside from financial accounts) where data allocation/optimization based on changing conditions is desirable. Such other fields may include, without being limited to, logistics (freight routing) optimization, farming (e.g., irrigation distribution allocation), energy (e.g., generator activity allocation), etc. Thus, although MDA server(s) 102 is described in some examples below with respect to data accounts associated with changing financial data, MDA server(s) 102 may be used with any type of allocation optimization that is dependent on volatile/constantly-changing underlying condition data, as noted above.

MDA server(s) 102 may include middleware engine 112, security management system 114, data monitor 116, one or more database structures 118 storing one or more MDAs (also referred to herein as MD account(s)), one or more web interface(s) 120, processing engine 122 and automated lifecycle processing system 124. In some examples, one or more of components 112-124 of MDA server(s) 102 may communicate with each other via a data and control bus (not shown). In some examples, MDA server(s) 102 may be configured to operate with multiple types of financial institution deployment models with complete elastic scalability and business continuity configurations. Although MDA server(s) 102 is shown in FIG. 1 as one server, MDA server(s) 102 may include one or more servers, whether co-located or linked across one or more networks.

In some examples, financial institution(s) 104 may be configured to communicate with MDA server(s) 102 via one or more data feed interfaces (e.g., for monitoring via data monitor 116, processing by processing engine 122, distribution via web interface(s) 120, etc.). The data feed interface(s) (not shown) may be specially configured as real-time connection(s). Thus, in operation, institution-specific DD information 134 may be distributed to MDA server(s) 102 from among financial institution(s) 104 via the real-time data feed interface(s).

In some examples, each data feed interface may include security protection (e.g., encryption) associated with a corresponding financial institution (e.g., financial institution 104-1). In some examples, different financial institution(s) 104 may include different data transfer formats. For example, in general, data feeds may be configured in one or more formats including, without being limited to, RSS (e.g., RDF Site Summary, Rich Site Summary, Really Simple Syndication), Atom, Resource Description Framework (RDF), comma-separated values (CSV), JavaScript Object Notation (JSON) and Extensible Markup Language (XML). In some examples, different financial institution(s) 104 may transmit the data with various unique, non-standard values and/or data formats (e.g., proprietary formats). Furthermore, in some examples, data content may correspond to different forms of data, such as different currencies, date formats, time periods, etc.

In some examples, middleware engine 112 may be configured to communicate with the various data feed interfaces, and may at least one of reformat the received data (representing institution-specific DD information 134) to a common format and/or normalize the data from among the data feeds, thereby creating data having a uniform data format. In some examples, middleware engine 110 may include a parameterized middleware engine that may allow for the creation of completely automated data feed interfaces to and from financial institutions(s) 104 with any suitable type of automated data reformatting, and data value translation (e.g., normalization). Middleware engine 112 may be configured to perform the reformatting and normalization without impacting core processing on MDA sever(s) 102 or that of financial institution(s) 104.

In some examples, security management system 114 may include one or more encryption and decryption keys and may be configured to provide data security protection of data received (or transmitted) via the data feed interfaces. In some examples, the encryption/decryption keys may include independent keys associated with respective financial institution(s) 104. In some examples, the encryption/decryption keys may include independent encryption/decryption keys by institution for the case of multi-tenant deployments. Security management system 114 may be configured to provide automated encryption of all sensitive data stored in MDA server(s) 102 and/or transmitted from MDA server(s) 102 to financial institution(s) 104, including independent encryption keys by institution for the case of multi-tenant deployments. In some examples, security management system 114 may operate synchronous with middleware engine 112 to decrypt received data from the data feed interface(s), permit middleware engine 112 to perform any reformatting/normalization operations and then encrypt the now uniformly-formatted data from middleware engine 112. Security management system 114 may provide secure and re-formatted data to data monitor 116.

Data monitor 116 may be configured to continually monitor data (e.g., in real-time and/or near real-time) from among one or more of financial institution(s) 104 (e.g., institution-specific DD information 134), user device(s) 106, MD account information for one or more MD accounts stored in storage 118, live market data from one or more real-time data sources 140, etc. In some examples, data monitor 116, based on the continual monitoring, may be configured to detect one or more changes in monitored data (e.g., changes to DD account condition data among one or more financial institutions(s) 104, changes to one or more DD account(s) 110), changes to one or more MD account(s), changes to live market data, etc.). The detected change(s) in monitored data may be based on one or more predefined criteria (such as at least one predefined rebalancing threshold). For example, data monitor 116 may detect a change in an APY value of at least one financial institution (e.g., financial institution 104-1) that may be useful for automatically rebalancing DDA(s) 110 of a particular user-defined MDA 136. Data monitor 116 may transmit any data that meets the predetermined criteria to dynamic balancer 132 of processing engine 122 for further processing.

In some examples, the predetermined criteria may include any APY changes by all insured financial institutions 104, a total/relative change of APY changes among financial institution(s) 104 and any exclusions defined by a particular user. In some examples, the predefined criteria may include an opt-in indication indicating approval for automatic rebalancing (e.g., automatically by processing engine 122 without any further user input). In some examples, data monitor 116 may transmit the opt-in indication with the monitored data that meets predetermined criteria for rebalancing. In some examples, data monitor 116 may not transmit any data to processing engine 122 where an opt-out indication for a particular depositor is indicated (as opposed to an opt-in indication).

Database structure(s) 118 may be configured to store information for one or more (current) user-defined MDAs 136 for one or more users. Non-limiting examples of MDA 136 information for a particular MDA 136 associated with a particular user may include one or more of an account number, an opening date, an original balance, a current (total) balance of the MDA 136, a current (total) APY of the MDA 136, a current (total) accrued interest of the MDA 136, linking information to individual DDA(s) 110 comprising the MDA 136, any user-defined exclusions, any user opt-in/opt-out criteria, other user-defined parameters and the like. In some examples, database structure(s) 118 may be configured to store one or more of DDA opening/processing action(s) 136, financial institution information (e.g., data security, data format, normalization, any network identifiers, geolocation(s), etc.), and user information (e.g., personal, account, network identifier(s), geolocation(s), user device information, etc.). In general, database structure(s) 118 may be configured to store any suitable information associated with financial institution(s) 104, user-defined MDA(s) 136, user device(s) 106 user(s) of user device(s) 106 that may be useful for middleware engine 112, security management system 114, web interface(s) 120, processing engine 122 and automated lifecycle processing system 124.

In some examples, database structure(s) 118 may include one or more complex database structures that are capable of transparently supporting multiple instances of a Structured Query Language (SQL) server. In some examples, each structure may be configured to support multiple databases, where each database may be configured to support multiple financial institutions in a multi-tenant deployment. In some examples, MDA server(s) 102 may utilize a number of data access security mechanisms, in addition to applying data encryption that may employ, for example, individualized encryption keys and strings for each financial institution 104.

Web interface(s) 120 may be configured to present one or more interactive graphical user interfaces (GUIs) on user device(s) 106 and/or on a computer device of financial institution(s) 104. Web interface(s) 120 may include customized MDA GUI 126 for interactive presentation of MD account information directly on user device(s) 106 (and/or via a computing device of financial institution(s) 104). Web interface(s) 120 may also include institution console 128 for interactive presentation of DD account information on at least one computing device of financial institution(s) 104.

More specifically, customized MDA GUI 126 (also referred to herein as MDA GUI 126) may be configured to generate one or more interactive webpages that provides the creation and management of MDA(s) 136 (including over the lifecycle of MDA(s) 136) via (interactive) account creation and account management tools.

MDA GUI 126 may generate a real-time GUI with account creation tools that allows users (via user device(s) 106 and/or a computing device on financial institution(s) 104) to introduce input for creating an MDA with one or more user-defined deposit parameters. Non-limiting examples of user-defined deposit parameters may include a total amount to be placed for the MDA account (e.g., a total amount to be placed for complete FDIC insurance) and exclusions (if any) of one or more insured financial institutions 104 where the user (e.g., a depositor) does not desire to place any funds (e.g., for a variety of reasons). The account creation tools may further include tools for viewing a (proposed) optimized combination of DDAs among financial institution(s) 104 (determined by processing engine 122 responsive to, for example, the user input and DD information 134).

The account creation tools may also allow users to introduce further input including multiple adjustments (e.g., alterations to one or more to-be-deposited amounts among the optimized combination of DDA(s)) and/or exclusions to the (proposed) optimized combination of DDA(s). As MDA GUI 126 receives user input indicating adjustment(s)/exclusions to the (proposed) optimized combination of DDA(S), processing engine 122 dynamically recalculates the combination of DDAs (e.g., by performing a new optimization that may include one or more of selecting at least one other financial institution 104, rebalancing amounts to-be-deposited among the (existing and/or new) combination DDAs, etc.), and MDA GUI 126 refreshes the display to present the adjusted (recalculated) proposed combination of DDAs that details the impact/effect of the user-defined adjustments. In some examples, the combination of DDAs (including any adjustments responsive to user-input) may automatically and dynamically be illustrated both numerically (e.g., in terms of to-be-deposited amounts), as well as graphically. Because changes to the proposed combination of DDAs are shown as the user adjustments are made, users may observe the impact of the adjustments in real-time.

Moreover, processing engine 122 may automatically recalculate the proposed combination of DDAs responsive to any changes to (the time-varying) DD information 134 (e.g., determined via data monitor 116). MDA GUI 126 may dynamically refresh the display to present the adjusted combination (determined by processing engine 122) in accordance with changes to the DD information 134. In this manner, changes to DD information 134 among one or more financial institutions 104 and their impact on the (proposed) combination of DDAs may be made transparent to users and provided to users in real time (and/or near real-time). Such information allows users to create a customized combination of DDAs based on the most up-to-date information, so that combination of DDAs ultimately approved (and opened) more accurately matches the user's desired account characteristics.

The account creation tools of MDA GUI 126 may also include one or more confirmation prompts allowing a user to confirm the (proposed) combination of DDAs (e.g., as originally optimized, after one or more revisions) to comprise the user-defined MDA 136. Responsive to user confirmation, MDA GUI 126 may send an indication of the user confirmation to automated lifecycle processing system 124, for automatic opening of the (approved) combination of DDAs (e.g., via a single opening process) with the selected financial institution(s) 104, funding (via funding service(s) 108) and automatic management of user-defined MDA 136 (comprising the combination of DDAs) over its lifecycle. In some examples, the user confirmation may also trigger MDA GUI 126 to generate one or more account management tools for the management of user-defined MDA 136.

The account management tools of MDA GUI 126 may allow users to introduce user input regarding any management parameters (e.g., alerts, rebalancing parameters, any other suitable parameters). In some examples, rebalancing parameters may indicate options for dynamic rebalancer 132 to automatically rebalance one or more DDAs 110 of MDA 136 based on any changes in the monitored data (via data monitor 116). In a non-limiting example, the rebalancing parameters may include one or more of an opt-in for automatic rebalancing, a request for further user input prior to any rebalancing, one or more parameters to initiate a rebalancing, an opt-out for automatic rebalancing, etc. The account management tools may also allow for real-time display of one or more current (e.g., up-to-date) characteristics of MDA 136 and/or individual DDAs 110 (that comprise MDA 136), as well as historical characteristics of MDA 136 and/or associated DDAs 110. The account management tools may also provide user input options to withdraw and/or transfer (e.g., to another account) at least a portion (including all) of the original balance of MDA 136 (e.g., subject to any maximum monthly penalty free withdrawals) as well as user input options to add electronic funds to MDA 136. Responsive to user input to add funds, optimization algorithm(s) 130 of processing engine 122 may determine an optimized allocation at one or multiple financial institution 104 for the additional funds, and MDA GUI 126 may present the optimized additional fund allocation to the user for confirmation and/or additional user adjustments.

Examples of customized MDA GUI 126 are described further below with respect to FIGS. 5-8D.

Web interface(s) 120 may also be configured to present institution console 128 (e.g., an interactive GUI) for presentation on one or more computing devices of financial institution(s) 104. Institution console 138 may be configured to generate one or more interactive webpages for management (e.g., pricing, APY offers) of individual DDA(s) 110 for financial institution(s) 104. In some examples, institution console 128 may be fed through an API. Examples of institution console 128 are described further below with respect to FIGS. 9A-9C.

Processing engine 122 may include one or more meta-deposit optimization algorithm(s) 130 and dynamic balancer 132. In some examples, processing engine 122 may include a computer program comprising computer-readable instructions that may be executed on at least one processor of one or more computers. In some examples, processing engine 122 may be configured to utilize/consume live market data, institution-specific DD information 134 from financial institutions 134 (e.g., via data monitor 116) and user inputs requesting creation of a user-defined MDA 136 (via MDA GUI 126). Based on the consumed inputs, processing engine 122, via meta-deposit optimization algorithm(s) 130, may determine a user-defined (electronic) MDA 136 that is an optimal combination of DDAs 110 at one or multiple financial institutions 104. In some examples, processing engine 122 may determine the user-defined MDA 136, which may comprise multiple demand deposit accounts 110 and one or multiple insured financial institutions 104. The optimal combination of DDAs 110 for the user-defined MDA 136 may be presented to the user (e.g., a depositor) via MDA GUI 126 (e.g., via a visual web interface).

In an example embodiment, optimization algorithm(s) 130 may consume three basic inputs (via DD specific information 134 and user input via MDA GUI 126). A first input may include APYs that each participating financial institution 104 is willing to pay in a demand deposit account with certain features (e.g., a maximum number of withdrawals per month, minimum balances, etc.). A second input may include maximum and minimum volume thresholds for each participating financial institution 104. A third input may include any exclusions associated with one or more financial institutions 104 at which a given user (e.g., depositor) does not desire to place funds.

In some examples, the (e.g., three) inputs (DD information 134/any user input) paired with the total amount of funds that the user (e.g., depositor) desires to place with full FDIC insurance and maximum APY may be used to determine an optimal allocation. In some examples, optimization algorithm(s) 130 may include one or more methodologies for solving a system of inequations subject to a set of constraints for a particular optimization (analytical). In some examples, one or more suitable iterative techniques may be used to solve the inequation system is an iterative (numerical) one. Processing engine 122 may execute optimization algorithm(s) 130 to create an initial optimized combination of DDAs, as well as one or more recalculated combination of DDAs, such as based on user input (e.g., during creation of MDA 136, due to withdrawals and/or addition of electronic funds during management of (opened and funded) MDA 136) and/or due to any changes in market conditions and/or institution-specific DD information 134 during the lifecycle of MDA 136.

Dynamic balancer 132 of processing engine 122 may be configured to communicate with data monitor 116, optimization algorithm(s) 130, MDA GUI 126 and automated lifecycle processing system 124 (and in some examples database structure(s) 118). Dynamic balancer 132 may automatically detect any change in information and/or data that may cause dynamic balancer 132, based on one or more predetermined conditions, to rebalance one or more of DDAs 110 (of MDA 136) using optimization algorithm(s) 130. In some examples, dynamic balancer 132 may automatically rebalance DDA(S) 110 (e.g., without any user input). In some examples, dynamic balancer 132 may prompt the user (e.g., via MDA GUI 126) for user input to confirm a rebalancing operation. In some examples, dynamic balancer 132 may automatically perform rebalancing under one or more first predefined conditions and may request user input to confirm rebalancing under one or more second predefined conditions. In general, the predefined condition(s) for rebalancing may include conditions set by MDA server(s) 102 and/or via user input. For example, dynamic balancer 132 may be configured to detect any changes among the DD account condition data (among DD information 134) via data monitor 116, may detect user input via MDA GUI 126 (e.g., indicative of adding electronic funds to and/or withdrawing electronic funds from MDA 136) and/or may detect an event from automated lifecycle processing system 124 that may trigger one or more predetermined conditions for rebalancing DDA(s) 110 to provide dynamic pricing adjustment.

Automated lifecycle processing system 124 may be configured to receive user-defined/system-created MDA(s) 136 comprising the optimized combination of DDA(s) 110 (to be opened) from processing engine 122 and may automatically manage the treatment (i.e., processing) of the created user-defined MDA(s) 136 (including the optimized combination of DDA(s) 110) over their lifecycle(s). In summary, a lifecycle of an account refers to the different stages (also referred to herein as events) that accounts may undergo, and it identifies which stages (events) may be managed and controlled automatically by automated lifecycle processing system 124. In one non-limiting example, lifecycle stages of user-defined MDA(s) 136 may include at least one of account opening, account funding, GL entry, interest accrual, statement data production, one or more settlements, taxation reporting, forms processing, and withdrawal management. An example of automated lifecycle processing system 124 is described further below with respect to FIG. 2.

Although not shown, MDA server(s) 102 may include at least one processor (e.g., processing device 1002 shown in FIG. 10) and non-transitory memory (e.g., memory 1006 shown in FIG. 10) storing one or more routines and or algorithms (e.g., optimization algorithm(s) 130) for performing the functions of MDA server(s) 102 described herein. An example implementation of one or more components of MDA server(s) 102 is shown by computer system 1000 (shown in FIG. 10).

In some examples, components 112-124 of MDA server(s) 102 may be embodied on a single computing device. In other examples, components 112-124 of MDA server(s) 102 may be embodied on two or more computing devices distributed over several physical locations, connected by one or more wired and/or wireless links. It should be understood that MDA server(s) 102 refers to a computing system having sufficient processing and memory capabilities to perform the specialized functions described herein.

Figure 2:
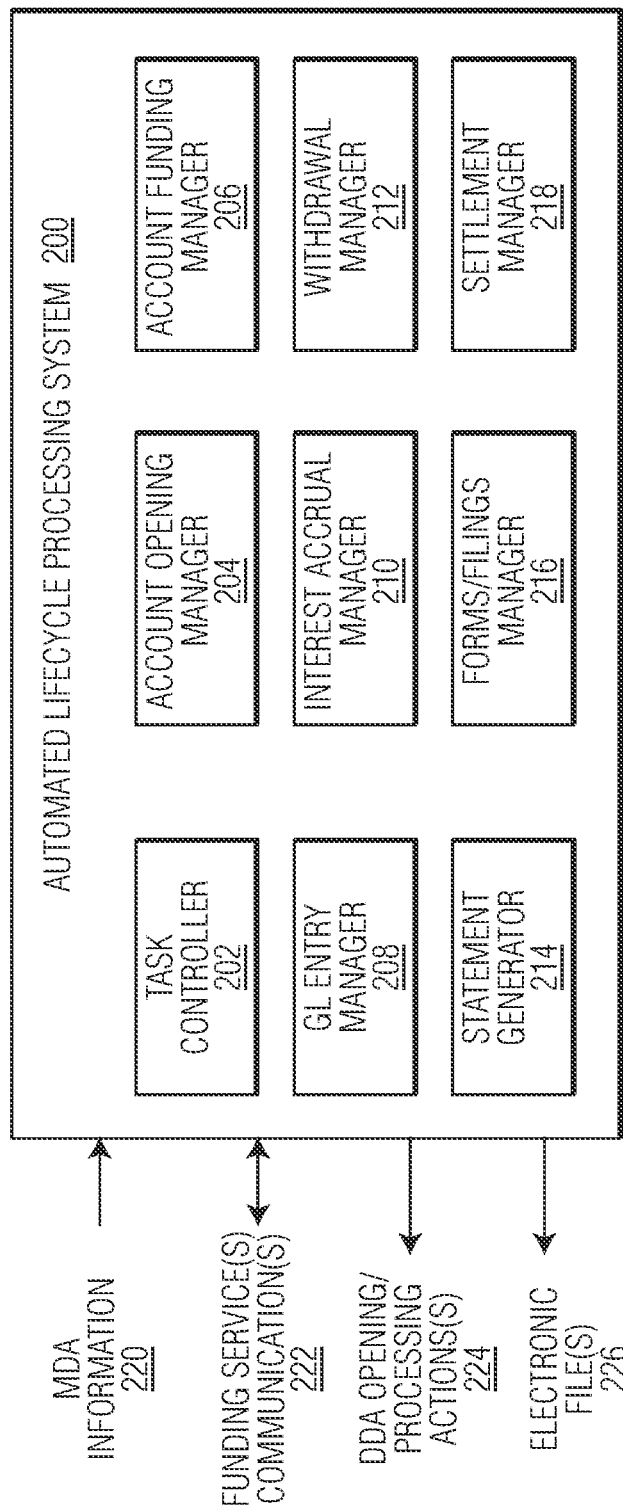
FIG. 2 is a functional block diagram of an example automated lifecycle processing system, according to an aspect of the present disclosure.

Referring now to FIG. 2, a functional block diagram of example automated lifecycle processing system 200 (referred to herein as system 200) is shown. System 200 may include task controller 202, account opening manager 204, account funding manager 206, GL entry manager 208, interest accrual manager 210, withdrawal manager 212, statement generator 214, forms/filings manager 216 and settlement engine 218. System 200 may be configured to receive MDA information 220 including information on user-defined MDA(s) 136, information regarding a combination of DDA(s) 110 comprising MDA(s) 136, an account initiation indication indicating that a newly approved user-defined MDA(s) 136 should be initiated, an update account indication indicating that an update to an existing user-defined MDA 136 should be initiated and the like, for example, from data monitor 116, processing engine 122, MDA GUI 126 and/or database structure(s) 118. System 200 may also include one or more communications 222 with one or more funding services 108. System 200 may also generate and transmit one or more DDA opening and/or processing actions 224 to one or more of financial institution(s) 104 and/or any other remote entity system (e.g., for downstream internal and/or external processing). In some examples, system 200 may also generate and transmit one or more electronic files 226 to one or more among financial institution(s) 104, user device(s) 106, funding service(s) 108 and/or any other remote entity system. Electronic file(s) 226 may include any suitable information regarding MDA(s) 136 and/or DDA(s) 110 that may be useful for a particular entity. In some examples, electronic file(s) 226 may be provided to at least one core banking system among financial institutions 104, for example for consolidation and reconciliation of records. In some examples, electronic file(s) 226 may be transmitted via one or more data feeds to financial institution(s) 104.

Task controller 202 may be configured to receive MDA information 220, including any account initiation and/or update indications. Task controller 202 may manage the handling of user-defined MDA(s) 136 (including the associated combination of DDA(s) 110) for one or more lifecycle operations specifically associated with MDA(s) 136 (e.g., such as opening, funding, reporting, settlements, etc.). Task controller 202 may be configured to control one or more of account opening manager 204, account funding manager 206, GL entry manager 208, interest accrual manager 210, withdrawal manager 212, statement generator 214, forms/filings manager 216 and settlement engine 218 to perform various lifecycle operation tasks associated with user-defined MDA(s) 136. In some examples, task controller 202 may be configured to identify one or more update events associated with user-defined MDA(s) 122 (e.g., based on any update indications in MDA information 220). Task controller 220 may be configured to use the identified update events to control operation of one or more of account opening manager 204, account funding manager 206, GL entry manager 208, interest accrual manager 210, withdrawal manager 212, statement generator 214, forms/filings manager 216 and settlement engine 218 to perform various lifecycle operation tasks associated with user-defined MDA(s) 136.

Account opening manager 204 may be configured to perform a real-time (or near real-time) automated single opening process for the optimized (and in some cases user-modified) combination of DDAs that comprise at least one newly approved user-defined MDA 136, for example, based on an account initiation indication (e.g., received from MDA GUI 126 and/or processing engine 122). Account opening manager 204 may determine one or more financial institutions 104 indicated in the combination of DDAs and may communicate with the identified financial institution(s) 104 (e.g., via one or more DD opening actions 224) to initiate opening of the combination of DDAs. Each identified financial institution(s) 104 may perform further account opening processes that may be specific to the individual financial institutions, responsive to communication with account opening manager 204.

Account funding manager 206 may be configured to perform fully automated real-time (and/or near real-time) management of funding and/or formalization of account characteristics associated with the combination of DDAs comprising user-defined MDA(s) 136. In some examples, account funding manager 206 may be configured to initiate (e.g., by one or more communications 222 with funding service(s) 108) automated funding and/or formalization of the combination of DDAs of user-defined MDA 136. In some examples, account funding manager 206 may be configured to further initiate one or more communications between individual financial institutions 104 that have opened DDA(s) 110 and funding service(s) 108 for providing electronic funding of each DDA 110 in the combination of DDAs. In some examples, account funding manager 206 may perform additional funding processing during the MDA's lifecycle, for example, when a user request for adding additional electronic funds to MDA(s) 136 (and/or to one or more particular individual DDAs of MDA(s) 136). The additional funding processing may include one or DDA processing action communications 224 among financial institution(s) 104 and/or one or more funding service(s) communications 222 with funding service(s) 108 in order to add electronic funds among DDAs 110.

GL entry manager 208 may be configured to perform fully automated processing of all GL entries associated with the combination of DDAs defining user-defined MDA(s) 136 over the MDA's lifecycle. Interest accrual manager 210 may be configured to perform fully automated interest accrual processing related to any interest accrual associated with the combination of DDAs defining user-defined MDA(s) 136 over the MDA's lifecycle. Table 1 illustrates an example of accrual entry information that may be generated by GL entry manager 208, for example in the form of a daily accrual entry that may be presented via web interface(s) 120. Table 2 illustrates an example of interest payment entry information that may be generated by interest accrual manager 210, for example in the form of an interest payment entry that may be presented via web interface(s) 120.

TABLE 1

Example Daily Accrual Entry

| Entry Name | General Ledger Entries | Entry Description |
|---|---|---|
| Daily Accruals | Debit Interest Expense $9.81<br>Credit Traditional Deposits Accrual $9.81 | Daily accounting interest accrual |

TABLE 2

Example Interest Payment Entry

| Entry Name | General Ledger Entries | Entry Description |
|---|---|---|
| Payment Date | Debit Traditional Deposits Accrual $304.11<br>Credit In-Process Settlements $304.11<br>Debit In-Process Settlements $304.11<br>Credit Customer Account $304.11 | Preparing to payout (from interest previously accrued)<br>Payment to customer |

Withdrawal manager 212 may be configured to perform fully automated real-time (and/or near real-time) management of any withdrawal of electronic funds associated with the combination of DDAs defining user-defined MDA(s) 136 over the MDA's lifecycle. For example, an account update indication may be provided to withdrawal manager 212 (e.g., via task controller 202) responsive to a user request to withdraw electronic funds from MDA(s) 136 (via MDA GUI 126) and after an optimized adjustment of funds among DDAs 110 of MDA(s) 136 (via processing engine 122) (and in some cases further adjustment(s) via user input). In some examples, withdrawal manager 212 may be configured to initiate one or more communications between individual financial institutions 104 that have opened DDA(s) 110 and funding service(s) 108 for providing electronic funding of each DDA 110 in the combination of DDAs, to initiate the withdrawal of the requested electronic funds.

Statement generator 214 may be configured to perform one or more statement processing operations to generate one or more statements and/or reports regarding the lifecycle processing of user-defined MDA(s) 136 (including any lifecycle processing associated with one or more of the combination of DDAs 110 comprising the MDA 136). The statement(s)/report(s) may be transmitted to one or more of financial system(s) 104, one or more of user device(s) 106 and/or any other remote system(s). In some examples, the statement(s)/report(s) may be transmitted as one or more electronic files 226. For example, the statements may include account statements, and the reports may include regulatory reports, government entity reports (e.g., tax reports), MIS reports (including intelligence reports), account reports (e.g., updates on MDA(s) 136), and/or any suitable information associated with user-defined MDA(s) 136. In general, statement generator 214 may generate one or more statements and/or reports associated with lifecycle processing operations and/or events (e.g., updates) of MDA(s) 136 over the respective lifecycle. In some examples, statement generator 214 may be configured to provide automated notifications of current processing statuses of MDA(s) 136.

Forms/filing manager 216 may be configured perform fully automated tax form processing and/or processing of one or more other predetermined forms associated with one or more lifecycle processing operations for the combination of DDAs defining user-defined MDA(s) 136 over the MDA's lifecycle.

Settlement manager 218 may be configured to perform fully automated processing of all settlements associated with the combination of DDAs defining user-defined MDA(s) 136 over the MDA's lifecycle. For example, settlement manager 218 may initiate and perform settlement processing (directly, and/or via one or more external systems) from an initial funding of DDAs of user-defined MDA(s) 136 through to a maturity of each DDA of user-defined MDA(s) 136. Processing operations of settlement engine 312 may including, in some examples, interest management, backup withholding processing, early withdrawals and/or processing at scheduled events.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network.

For example, a system according to the present disclosure includes an ordered combination of specialized computer components (e.g., middleware engine, security management system, data monitor, database structure(s), web interface(s) including a customized MDA GUI, processing engine, etc.) that, collectively, receiving/ retrieving real-time data having varying data formats and originating from any number of external systems, continually monitoring time-variable account condition data from multiple external systems, providing a specialized interactive GUI that creates user-defined MDAs having a system-optimized combination of DDAs (which DDA combination may further be adjusted by the user via the interactive GUI and which combination is determined and adjusted based on the time-variable monitored account condition data), opening the DDA combination via communication with multiple external systems, detecting changes in the monitored data (and any user inputs) and automatically rebalancing the DDAs responsive to the detected changes, dynamically updated the interactive GUI based on changes to the monitored data and/or rebalancing of the DDA's, and managing lifecycle processing actions for the MDA (comprising the DDA combination) by interacting with one or more external systems and initiating one or more automated actions.

As a result, the MDA server(s): obtain the most up-to-date information; provide an interactive customizable-MDA creation and management user interface including the ability to dynamically customize an MDA (including a combination of proposed DDAs as selected and optimized by the system based on the most up-to-date account condition data); provide a transparent and dynamic representation of the MDA characteristics (including an impact of user selection(s)/adjustment(s) to the MDA in real-time (based on the most-up-to-date information)); automatically and in real-time (and/or near real-time) provides pricing rebalances among the DDA combination (of the MDA) in accordance with changes in (continually) monitored data; dynamically updates the GUI, and manages processing of the user-defined MDAs over their lifecycles. Thus, the system thereby provides an improved user interface, provides automatic user-customizable real-time creation of MDAs (including their DDAs), and also provides improved real-time automatic management of MDAs (and their DDAs, including their opening process), all while improving the transparency of MDA creation to the user, increasing the speed to open and manage MDAs, significantly decreasing (and explicitly removing in at least some operations) reliance on manual processing, all without increasing the computational burden on the entity systems that create and process DDAs, and improving the accuracy of the MDAs available to users through the interactive user interface.

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented as data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 3:
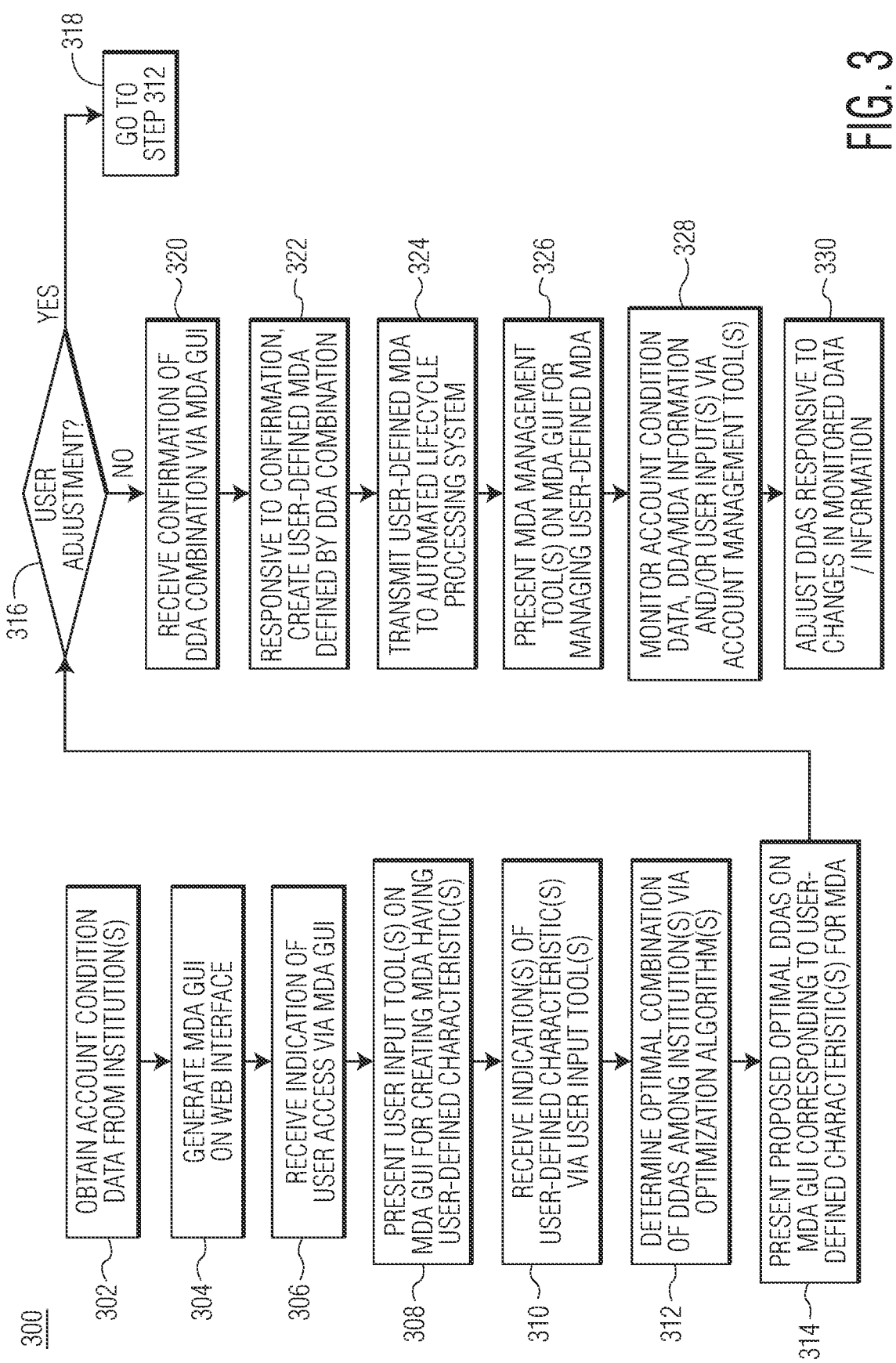
FIG. 3 is a flowchart diagram of an example method for real-time creation and management of user-defined meta-deposit accounts, according to an aspect of the present disclosure.
Figure 4:
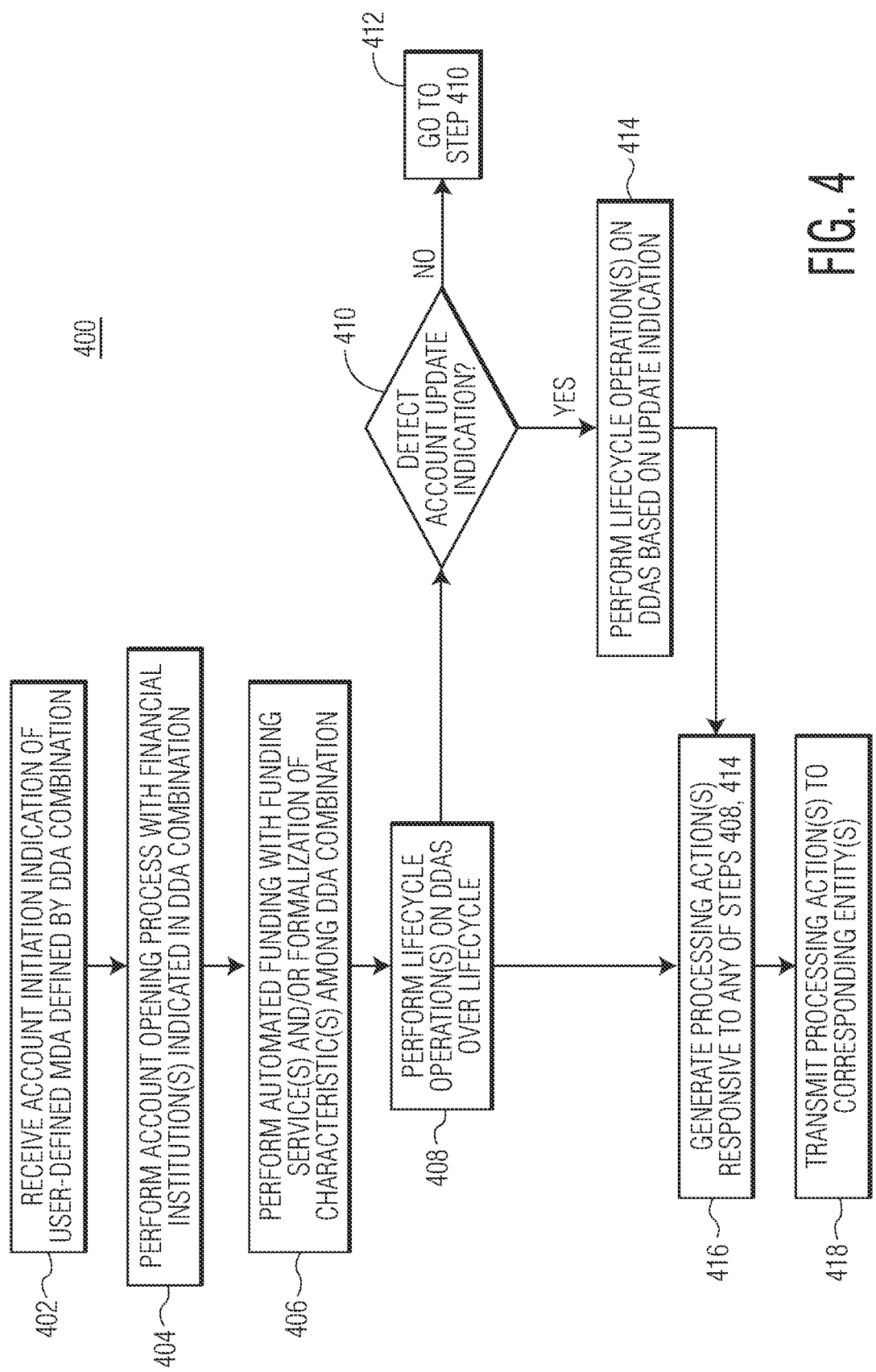
FIG. 4 is a flowchart diagram of an example method for automated processing of at least one user-defined meta-deposit account over a lifecycle of the meta-deposit account, according to an aspect of the present disclosure.

MDA server(s) 102 may be configured with more or less components to conduct the methods described herein with reference to FIGS. 3 and 4. In particular, FIG. 3 is a flowchart diagram illustrating an example method for real-time creation and management of a user-defined MDA, according to an aspect of the present disclosure; and FIG. 4 is a flowchart diagram illustrating an example method for managing a lifecycle of a user-defined MDA, according to an aspect of the present disclosure. As illustrated in FIGS. 3 and 4, the methods shown may be performed by processing logic that may comprise hardware (e.g., circuitry, dedicated logic, programmable logic, microcode, etc.), software (such as instructions run on a processing device), or a combination thereof In one embodiment, the methods shown in FIGS. 3 and 4 may be performed by one or more specialized processing components associated with components 112-124 of AAM system 100 of FIG. 1. It is understood that methods shown in FIGS. 3 and 4 represents a non-limiting example of creating and managing MDA(s) 136 comprising a combination of DDAs. The methods may also be implemented to create any other type of electronic data account anticipated by the present disclosure.

Referring next to FIG. 3, a flowchart diagram of an example method 300 for real-time creation and management of at least one MDA 136 is shown. At step 302, MDA server(s) 102 may obtain DD account condition data from among financial institution(s) 104. For example, MDA server(s) 102 may obtain DD account condition data from among institution-specific DD information 134 (e.g., via middleware engine 112). Although not shown, data monitor 116 may continually monitor the received account condition data to detect any changes. In this manner, the processing performed to create and manage MDA(s) 136 may use the most up-to-date information. In some examples, the account condition data (which may be specific to each financial institution 104) may be provided as part of one or more rate tables. In some examples, the account condition data may include (without being limited to) at least one interest rate and/or at least one APY that the institution may be willing to pay for funds placed in a DDA, a minimum balance in an individual DDA and a maximum balance across all DDAs the insured financial institution may be willing to accept.

At step 304, MDA server 102 may generate MDA GUI 126 via at least one web interface 120. At step 306, MDA GUI 126 may receive an indication of user access, for example, directly via user device(s) 106 and/or at least one computing associated with one or more among financial institution(s) 104 (e.g., indirectly via an advisor).

At step 308, MDA GUI 126 may present an MDA creation tool including one or more user input tools for creating an MDA having user-defined characteristic(s). In some examples, characteristics available for user-customization (e.g., financial institution(s) 104 available for creation of an optimized combination of DDAs, a total amount available for creating an MDA account, a total number of financial institution(s) 104 that may be combined to create an optimized combination of DDAs, and/or other suitable characteristics for creating and/or managing MDA(s) 136) may be filtered according to one or more characteristics of a particular user. Non-limiting examples of user characteristics that may be used to filter available customization may include a user's (or user device's) geolocation, a wealth categorization, an industry, an existing relationship between the user and financial institution(s) 104, etc.

At step 310, MDA GUI 126 may receive one or more indications of user-defined characteristic(s) for the (to-be-created) MDA 136 via the user input tool(s). In some examples, the user-defined characteristic(s) may include a total amount to be placed in the MDA 136 for complete FDIC insurance. In some examples, the user-defined characteristic(s) may also include any exclusions of insured financial institutions where the user (e.g., a depositor) does not desire to place any funds (e.g., for a variety of reasons). At step 312, processing engine 122, via optimization algorithm(s) 130, may determine an optimal (proposed) combination of DDAs among one or more of financial institution(s) 104, based on the user-defined characteristic(s) (in step 310) and the most up-to-date DD account condition data from among financial institution(s) (in step 302). At step 314, the proposed optimal combination of DDAs (also referred to herein as DDA combination) may be presented on MDA GUI 126, such that the proposed DDA combination corresponds to the user-defined characteristic(s) (received at step 310). In some examples, the proposed DDA combination may indicate, for each DDA, a financial institution associated with the DDA and an amount for the particular DDA. In some examples, a blended APY for the DDA combination may also be shown.

At step 316, MDA GUI 126 may determine, responsive to step 314, whether any user adjustments to the proposed DDA combination are indicated via the user input tool(s).

If, at step 316, one or more user adjustments are indicated (e.g., adjustment of one or more fund amounts for the proposed DDA combination and/or exclusion of one or more selected financial institutions 104), step 318 may proceed to step 312 (at step 318). Processing engine 122 may recalculate an (adjusted) optimal DDA combination based on the user adjustment(s). Steps 312-318 may be repeated one or more times depending on any further user adjustments.

Although not shown in FIG. 3, processing engine 122 may receive any changes in DD account condition data (including any changes in real-time and/or near real-time) via data monitor 116. Based on this change in monitored data, processing engine 122 may automatically recalculate an optimal DDA combination and MDA GUI 126 may automatically update the presented DDA combination in accordance with changes in the DD account condition data. Thus, the proposed DDA combination presented to the user (e.g., in step 314 including after user adjustment) may be automatically updated to reflect the most up-to-date underlying account condition data.

If, at step 316, no user adjustments (or no further user adjustments) are indicated, step 316 may proceed to step 320. At step 320, MDA GUI 126 may receive a confirmation of a proposed (and/or adjusted) optimal DDA combination for the (to-be-created) MDA 136, via the user input tool(s). In some examples, the confirmation indication may include a first confirmation that the DDA combination is approved and a second confirmation to create the MDA 136 (e.g., initiate opening and funding processes for the approved DDA combination). In some examples, the confirmation indication may include a single confirmation that may both indicate user approval of the DDA combination and approval to create the MDA 136 (via the opening/funding processes).

At step 322, MDA GUI 116, responsive to the confirmation indication (at step 320) may initiate creation of the user-defined MDA 136 defined by the (approved) DDA combination. At step 324, MDA server(s) 102 may transmit user-defined MDA information for creating the MDA and DDA combination to automated lifecycle processing system 124. In some examples, the user-defined MDA information may include an account initiation indication, indicating that the newly approved user-defined MDA 136 should be initiated. In some examples, the user-defined MDA information may include a total amount of the MDA 136, information for each DDA in the DDA combination (e.g., an amount to be funded, the associated financial institution), user information and the like. In some examples, the user-defined MDA information may also include any opt-in/opt-out criteria, any user prompts and/or other user-defined criteria for rebalancing of DDAs subject to changes in monitored data over the lifecycle of the MDA 136. In some examples, the user-defined MDA information may be stored in database structure(s) 118.

At step 326, MDA GUI 126 may present one or more MDA management tools including one or more user input tools for managing user-defined MDA 136 over the MDA's lifecycle. In some examples, the user management tool(s) may include options for setting alerts and/or rebalancing criteria for the DDA combination. The user management tool(s) may also include user input tool(s) for adding electronic funds and/or withdrawing electronic funds from MDA 136.

At step 328, data monitor 116 may monitor various data including one or more of DD account condition data among financial institution(s) 104, DDA information among financial institution(s) 104, MDA information (e.g., stored in database structure(s) 118) and any user input via the account management tool(s) of MDA GUI 126.

At step 330, processing engine 122, via dynamic balancer 132 and optimization algorithm(s) 130, may adjust one or more of the DDAs in the DDA combination (e.g., via rebalancing pricing) responsive to any detected change in the monitored data (at step 328). In some examples, the rebalancing operation(s) may depend on any user rebalancing criteria. In some examples, the rebalancing may be performed automatically (without any user input), such as by automated lifecycle processing system 124 (e.g., responsive to an update indication provided by processing engine 122). In some examples, the rebalancing may be performed subject to prompting the user to confirm the rebalancing.

Referring to FIG. 4, a flowchart diagram is shown of an example method 400 for automated processing of at least one user-defined MDA 136 over a lifecycle of the MDA 136, according to an aspect of the present disclosure. In one embodiment, method 400 shown in FIG. 4 may be performed by one or more specialized processing components associated with automated lifecycle processing system 124 of FIG. 1 and/or automated lifecycle processing system 200 of FIG. 2. At step 402, automated lifecycle processing system 124 (and/or 200) may receive at least one account initiation indication of at least one user-defined MDA 136 defined by a DDA combination. The account initiation indication may indicate that a user-defined MDA 136 has been newly approved and is ready to be initiated (e.g., activated such as by opening, funding, etc.). In some examples, the account initiation indication may be provided to task controller 202 as part of MDA information 220.

At step 404, automated lifecycle processing system 124 (200) may perform an account opening process with one or more financial institutions 104 indicated in the DDA combination defining the user-defined MDA 136. For example, account opening manager 204 of automated lifecycle processing system 200 may perform one or more operations including determining one or more financial institutions 104 indicated in the DDA combination and perform one or more communication(s) of DDA opening action(s) 224 with financial institution(s) 104. In some examples, the account opening process may include a real-time (or near real-time) automated single opening process. In some examples, DDA opening action(s) 224 may include an indication of a funding amount for the DDA(s) 110 (e.g., as approved in step 320 of FIG. 3 during the MDA creation process), as well as any suitable user information and/or MDA account information for opening DDA(s) 110 and for linking to the MDA 136. In some examples, responsive to receiving DDA opening action(s) 224, each respective financial institution(s) 104 may (independently) perform a further (downstream) DD account opening process that may be specific (e.g., proprietary, internal) to the particular financial institution 104.

At step 406, automated lifecycle processing system 124 (200) may perform an automated electronic funding process with one or more financial services 108 for electronic funding of each DDA 110 in the DDA combination and/or any formalization of account characteristics of the DDA combination. For example, account funding manager 206 of automated lifecycle processing system 200 may perform one or more operations including initiating (e.g., by one or more communications 222 with funding service(s) 108) automated electronic funding and/or formalization of the DDA combination. In some examples, account funding manager 206 may further initiate one or more communications between individual financial institutions 104 that have opened DDA(s) 110 and funding service(s) 108 for providing electronic funding of each DDA 110. In some examples, funding service communication(s) 108 may include information on funding amounts for each DDA 110 in the DDA combination, financial institution information for each associated financial institution 104 (such as routing information, identification information, security information and the like). In some examples, funding service(s) 108 may perform additional processing responsive to communication(s) 222 such as verification of sufficient funding, real-time electronic fund movement to financial institution(s) 104 and the like. In some examples, financial institution(s) 104 may (independently) perform a further (downstream) DD account funding operations that may be specific (e.g., proprietary, internal) to the particular financial institution 104 for funding of DDA(s) 110 via funding service(s) 108. In some examples, financial institution(s) 104 may further transmit a confirmation of funding (and/or any other suitable information) responsive to successful funding of DDA(s) 110 and/or a notification of failure to fund DDA(s) 110.

At step 408, automated lifecycle processing system 124 (200) may perform one or more lifecycle operations over the lifecycle of user-defined MDA(s) 136. In some examples, one or more of components 206-218 of automated lifecycle processing system 200 may perform one or more lifecycle operations such as additional funding processing, GL entry processing, interest accrual processing, withdrawal processing, statement generation processing, forms/filing processing and/or settlement processing.

At step 410, automated lifecycle processing system 124 (200) may determine whether any account update indications have been received. For example, processing engine 122 may generate an account update indication responsive to a detected change in monitored data (e.g., as shown in step 328 of FIG. 3). The account update indication may indicate any adjustments to one or more DDA(s) 110 in the DDA combination (e.g., based on changes to account condition data, user input, etc.) as well as any other suitable information which may be used to trigger one or more lifecycle operations by automated lifecycle processing system 124 (200).

When, at step 410, no account update indication is received, step 410 proceeds to step 412 and method 400 continues to monitor for any account update indication(s) (at step 410).

When, at step 410, an account update indication is detected, step 412 proceeds to step 414. At step 412, one or more lifecycle operations may be performed based on (information provided in) the account update indication. For example, task controller 202 of automated lifecycle processing system 200 may receive an account update indication (e.g., from processing engine 122), and may activate one or more of components 206-218 to perform respective lifecycle operation(s). For example, rebalancing DDA(s) 110 may include initiating one or more of account funding manager 206 and withdrawal manager 212. The rebalancing operation(s) may further trigger one or more additional components among 206, 210, 214-218.

At step 416, automated lifecycle processing system 124 (200) may generate one or more processing actions (e.g., DDA processing action(s) 224) responsive to lifecycle operation(s) in any of steps 406 and 414. In some examples, automated lifecycle processing system 124 (200) may generate one or more electronic file(s) 226 based on one or more of the lifecycle operation(s). At step 418, automated lifecycle processing system 124 (200) may transmit the processing action(s) (and/or electronic file(s)) to one or more corresponding entities (e.g., one or more among financial institution(s) 104, user device(s) 106, funding service(s) 108 and/or any other suitable remote entity system).

In general, step 408 performs lifecycle operation(s) on the DDA combination over the MDA's lifecycle, based on one or more expected tasks and/or events (e.g., expected settlements, expected statement generation, expected tax filings, etc.). Steps 410-414 captures detected changes due to variations in underlying data (in real-time and/or near real-time) that may impact the DDA combination and automatically performs lifecycle operation(s) in response to the detected changes.

Figure 5:
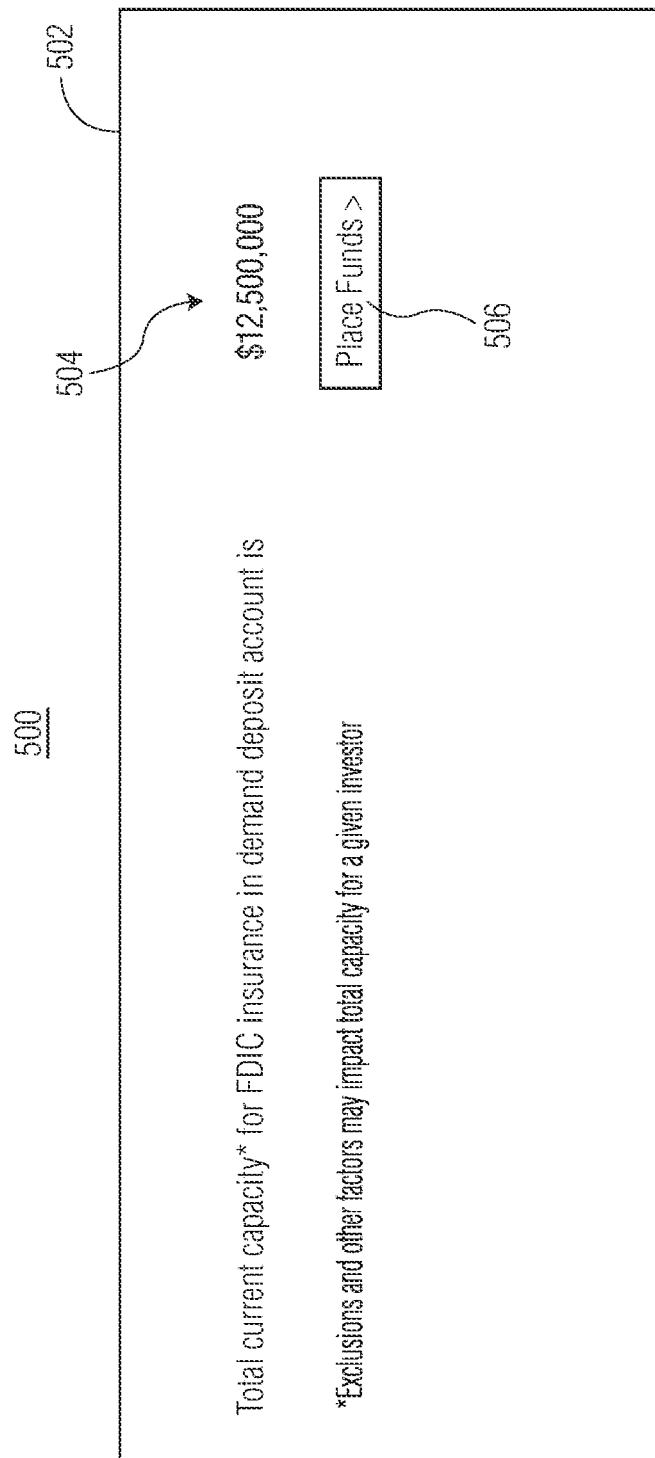
FIG. 5 is an example screenshot of an interactive GUI illustrating real-time current insurance capacity for demand deposit account(s), according to an aspect of the present disclosure.
Figure 7B:
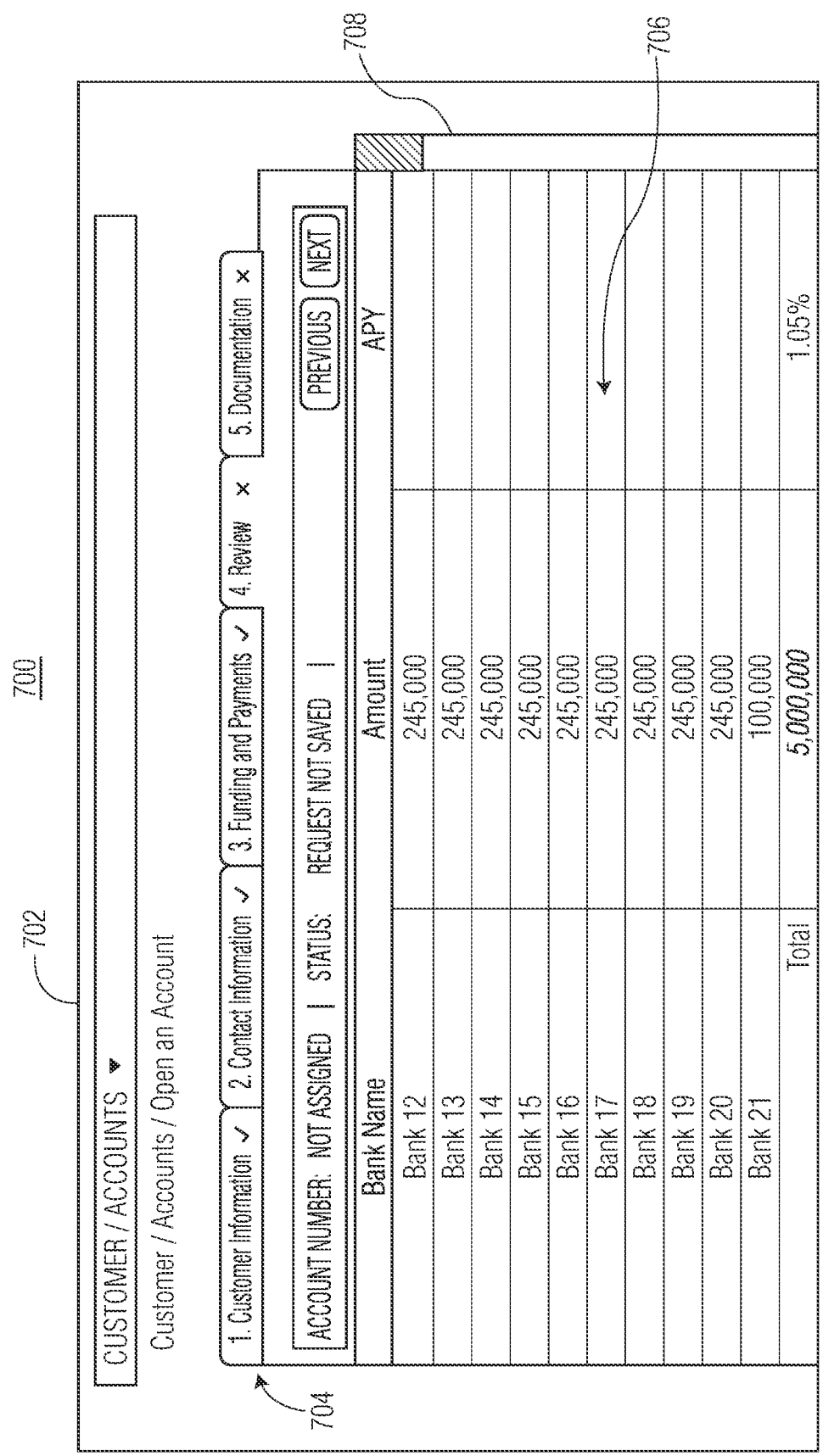
Figure 8A:
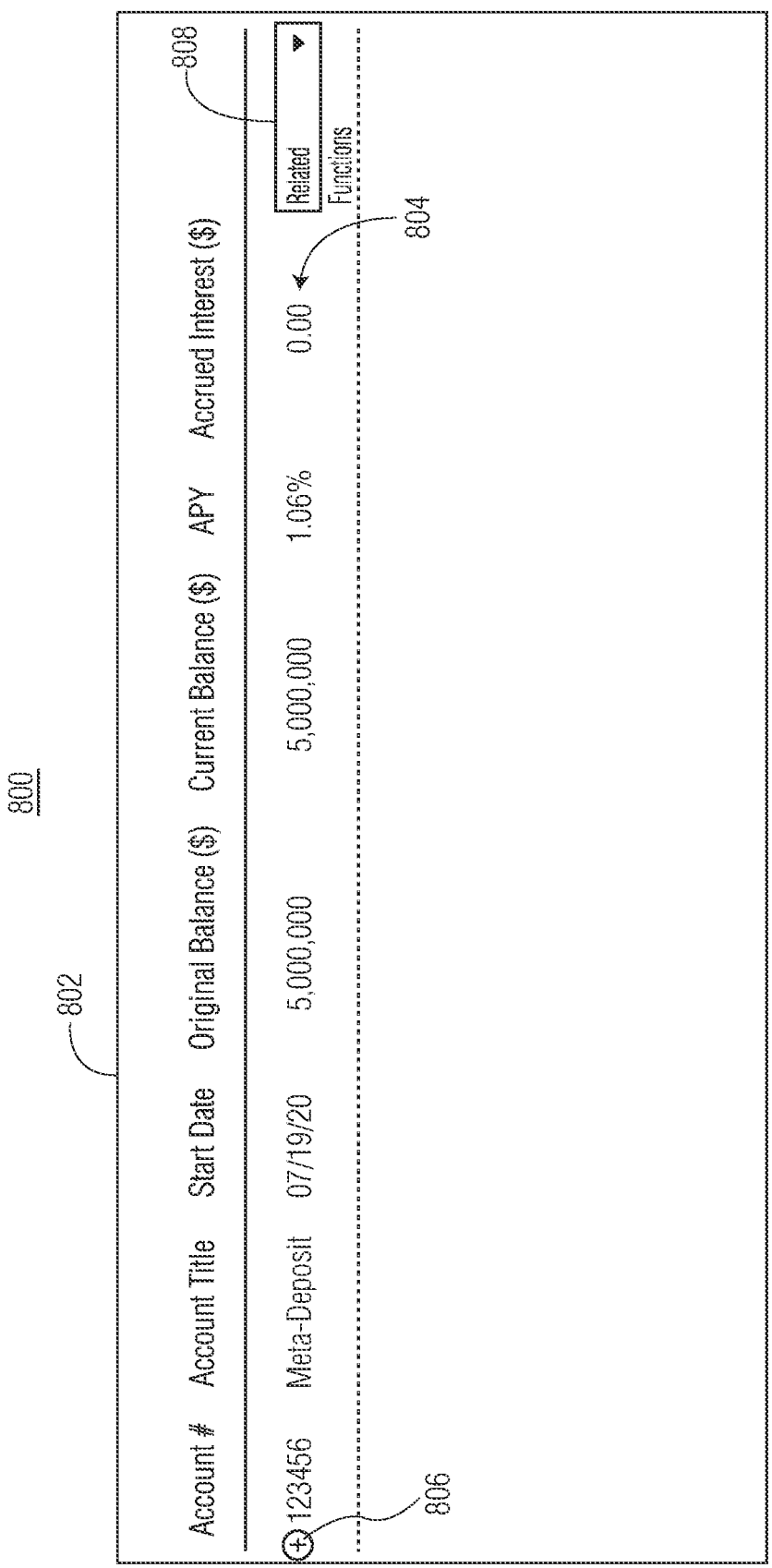
Figure 8C:
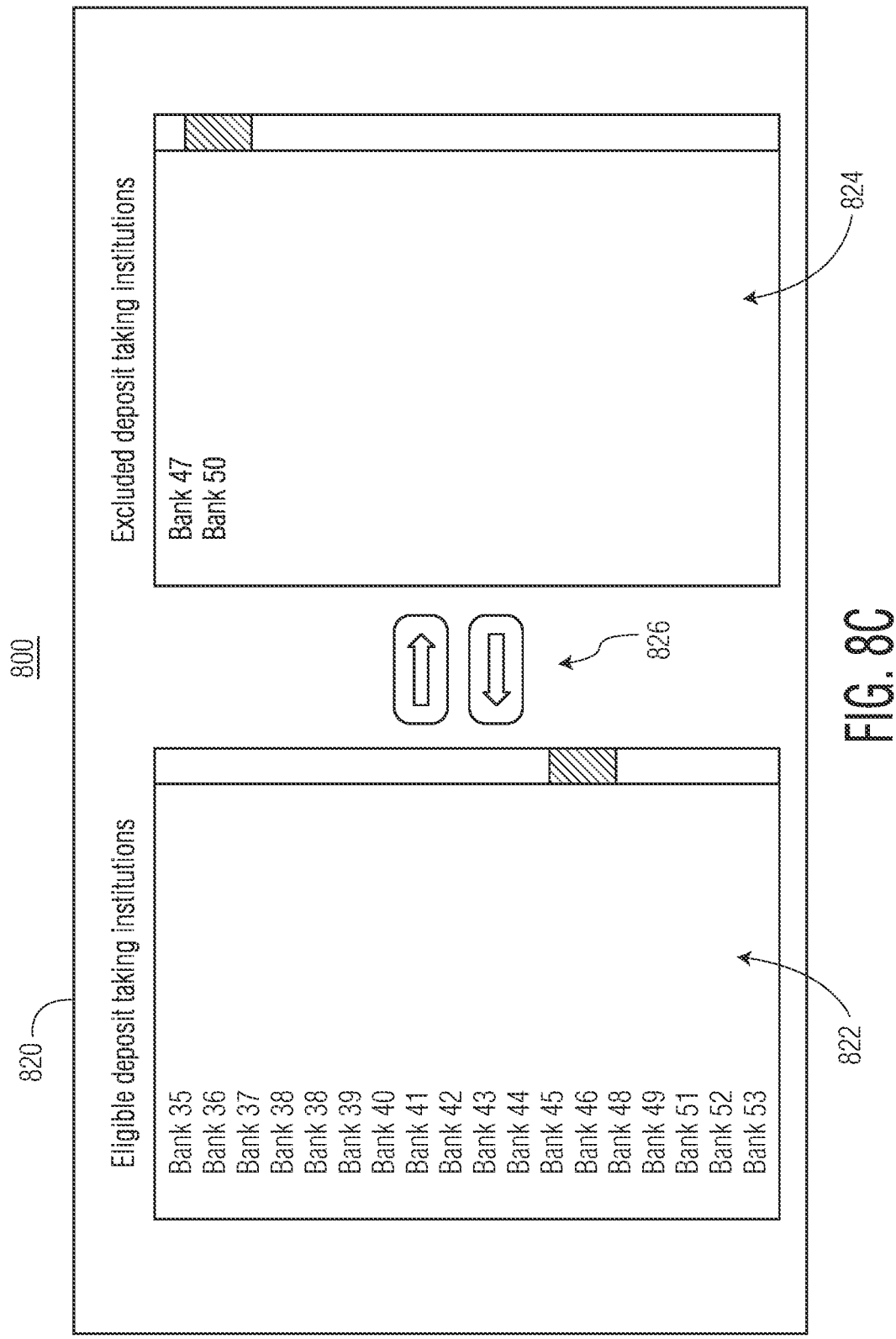
Figure 9A:
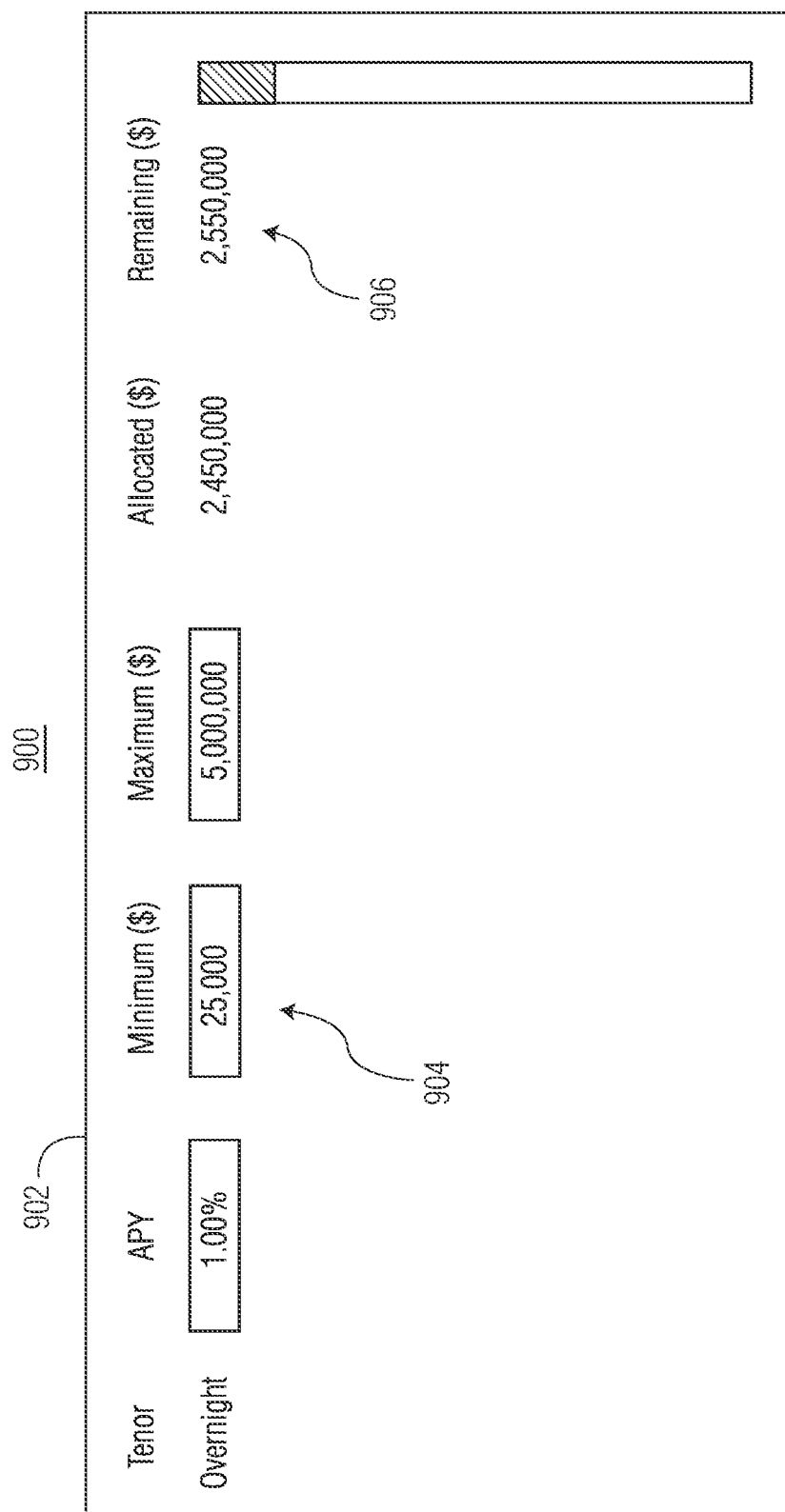

Referring next to FIGS. 5-9C, these figures illustrate one or more example web interfaces (comprising one or more interactive GUIs) for users (e.g., depositors, financial intermediaries such as advisors, distribution partners, etc.) and/or financial institutions (e.g., deposit institutions) to create and interact with user-defined MDA(s) defining DDA combination(s) and/or managing the user-defined MDA(s) (including the DDA combination(s)) over the lifecycle of the MDA(s). The web interface(s) comprising interactive GUIs shown in FIGS. 5-9C may represent examples of web interface(s) 120, including examples of customized MDA GUI 126 and institution console 128. In particular, FIG. 5 is an example screenshot of interactive GUI 500 illustrating an indication of real-time current insurance capacity for demand deposit account(s); FIGS. 6A-6E are example screenshots of interactive GUI 600 for dynamically creating user-customized meta-deposit account(s); FIGS. 7A and 7B are example screenshots of interactive GUI 700 for dynamically creating user-customized meta-deposit account(s); FIGS. 8A-8D are example screenshots of interactive GUI 800 for dynamically managing user-customized meta-deposit account(s); and FIGS. 9A-9C are example screenshots of interactive console GUI 900. Although exemplary sections/windows are depicted in FIGS. 5-9C, alternative configurations for the sections/windows are envisioned. For example, each interactive GUI (e.g., GUIs 500-900) may include more or fewer sections, windows, webpages and/or tabs. Additionally, the sections/windows may be reorganized and displayed to optimize GUI space and efficient utilization of pertinent information.

FIG. 5 illustrates meta-deposit maximum capacity screen 502 of interactive GUI 500. Screen 502 may include region 504 indicating a real-time current insurance capacity for demand deposit account(s) and fund placement button 506. In some examples, screen 502 may be used by depositors (e.g., directly by users) and/or advisors (e.g., indirectly by users via at least one financial intermediary). In some examples, selection of fund placement button 506 may initiate creation of a user-customizable MDA. In some examples, interactive GUI 500 may be part of MDA GUI 126 (FIG. 1). In some examples, interactive GUI 500 may be provided as part of a platform screen and plug-in for inclusion in one or more partner websites.

Referring next to FIGS. 6A-6E, example screenshots of interactive GUI 600 (also referred to herein as MDA builder GUI 600) for dynamic creation of user-customized MDA(s) are shown. In some examples, interactive GUI 600 may be part of account creation tools of MDA GUI 126 (FIG. 1) for creating user-defined MDA(s) 136 in real-time (and/or near real-time). In some examples, MDA builder GUI 600 may be used by depositors (e.g., directly by users) and/or advisors (e.g., indirectly by users via at least one financial intermediary).

FIG. 6A illustrates initial screen 602 of MDA builder GUI 600. In some examples, screen 602 may be displayed upon selection of fund placement button 506 (FIG. 5). Screen 602 may include selection region 604 that may allow a user to input a total amount to deposit for a desired MDA (e.g., via textual input). In some examples, selection region 604 may include addition user input tools, such as a confirmation button to initiate determination of a DDA combination for the desired MDA.

Screen 602 may also include a display region 606 that displays details of a proposed optimized DDA combination (e.g., as determined by processing engine 122) based on the user desired total funding amount (e.g., as input in selection region 604). Screen 602 may also include display format selector buttons 608 to toggle display region 606 between a table format display of the DDA combination details (as shown by table results region 612 of screen 610 in FIG. 6B) and a graphical format display of the DDA combination details (as shown by graphical results region 632 of screen 630 in FIG. 6D). Initially, display region 606 may be empty or include minimal information. Responsive to user input in selection region 604, processing engine 122 may determine an optimized combination of DDAs, and display region 606 of screen 602 may be updated to display the (proposed) optimized DDA combination results (e.g., as table results region 612 if the selector buttons 608 are initially set to select a table format display).

Figure 6B:
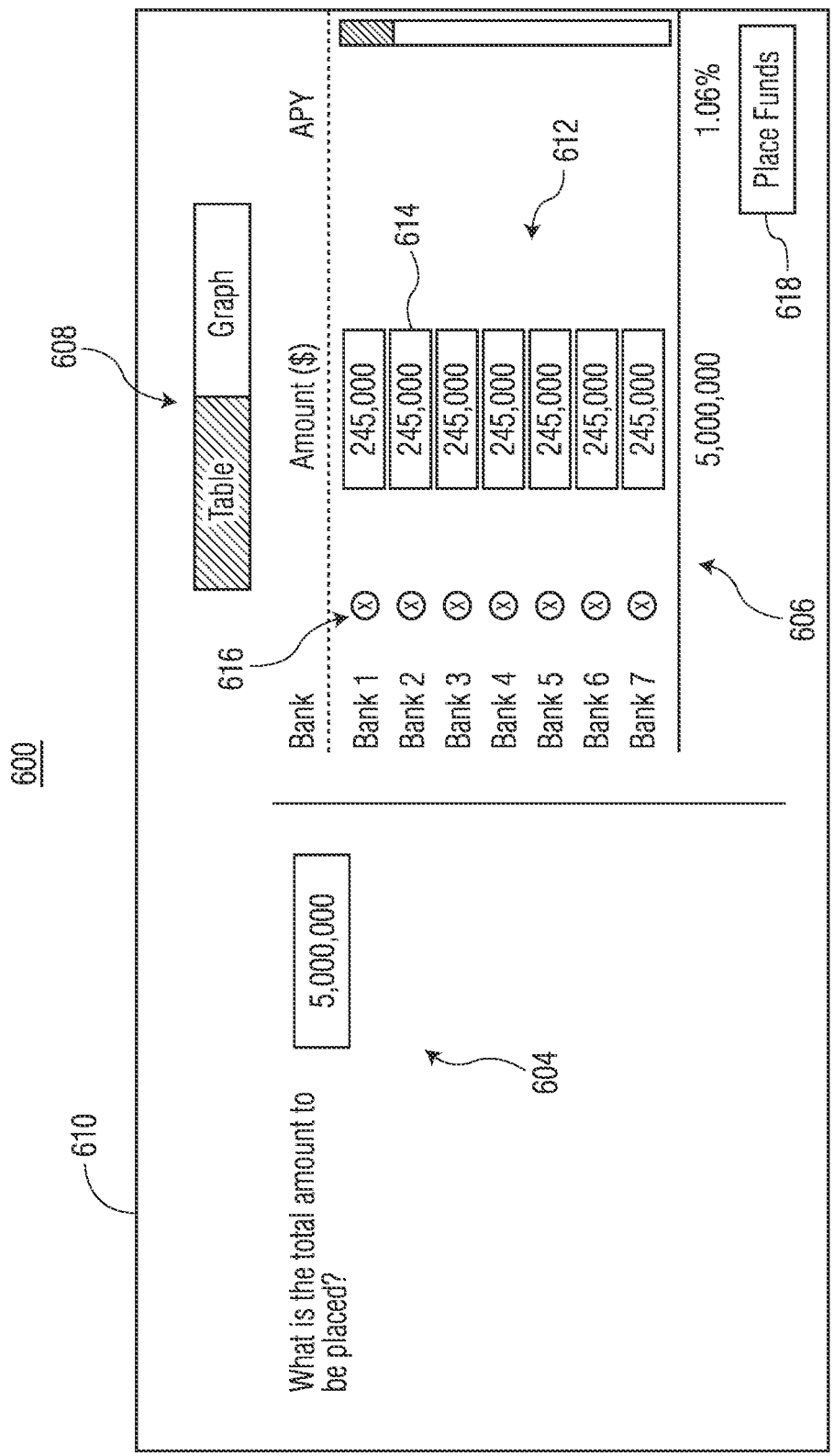

Referring to FIG. 6B, Screen 602 may also include financial institutions and proposed funding amounts, and in some examples at least one indication of APY). As data is entered into selection region 604, the graphical display region 606 may be automatically updated to reflect such input.

Figure 6C:
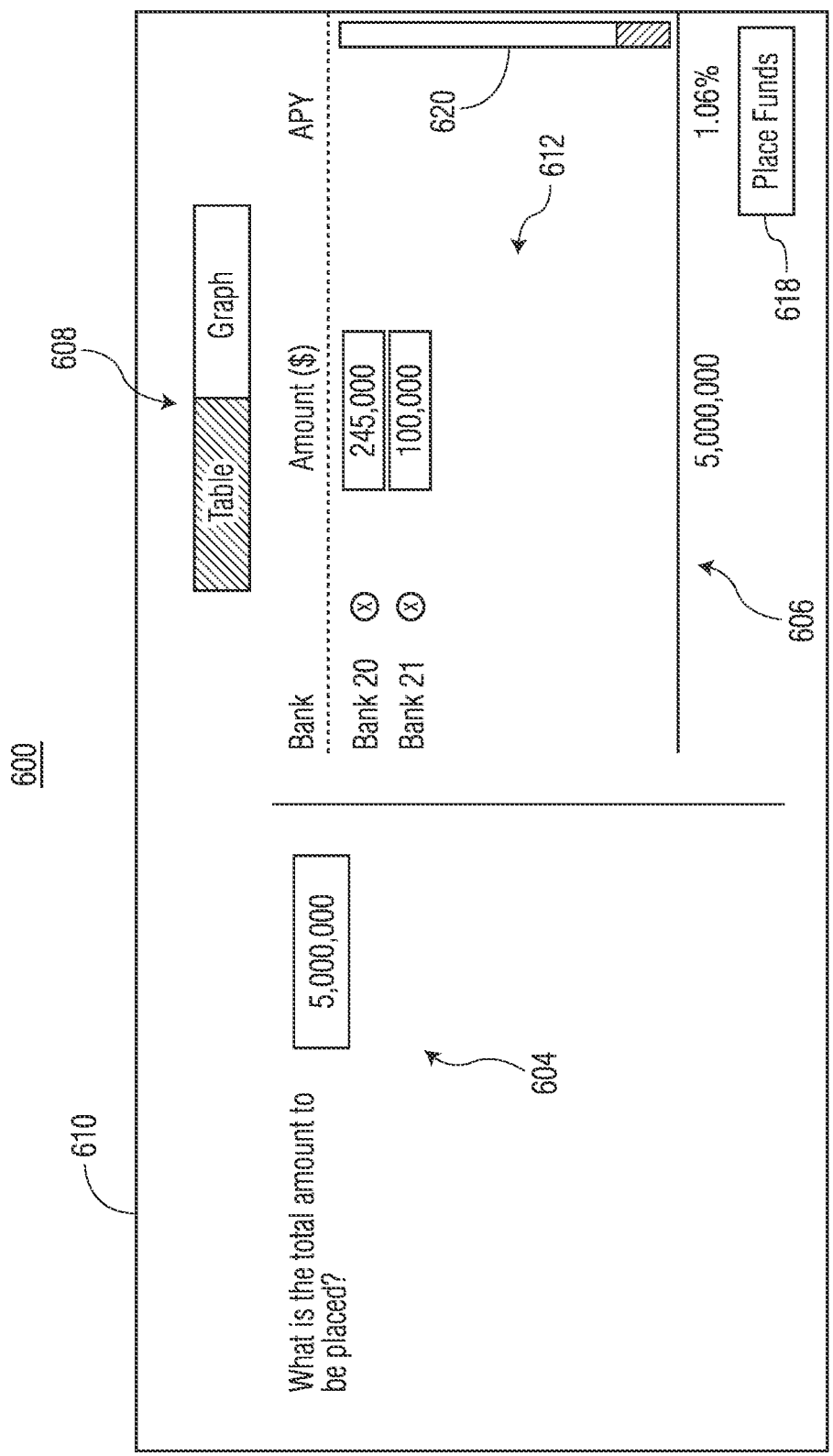

FIGS. 6B and 6C illustrates an exemplary proposed DDA allocation screen 610 of MDA builder GUI 600, which may be displayed if a table format display option among display format selector buttons 608 is selected (and/or initially when user input in selection region 604 is indicated). Table results region 612 of screen 610 may include a combination of DDAs (determined by processing engine 122), including information on the selected financial institution(s) 104 (e.g., bank systems) and individual DDA funding allocations, as initially determined by MDA server(s) 102 as representing an optimized DDA combination for the user-defined MDA. In some examples, table results region 612 may publicly display a blended APY (e.g., for all financial institutions as allocated). Optionally, table results region 612 may also include areas to display APY data for individual financial institutions. This data for individual financial institutions 104 may not be publicly displayed (e.g., if the data is considered to be confidential for a particular financial institution 104 such as a bank system), but may be privately displayed if the user is an authorized user (e.g., of a particular bank system). In some examples, the APY that is displayed in display region 606 may be is adjusted in real time (and/or near real-time) based on monitored data.

Table results region 612 may include options to adjust the DDA allocation, for example, via one or more selector buttons 616 to remove (and/or add) various allocated financial institutions and editable amounts to be allocated to each financial institution (e.g., which may be edited via textual input such as shown by editable text box 614). In some examples, the amounts allocated to each financial institution may be editable such that the total amount can be distributed in a different manner, with the total amount remaining fixed (e.g., $5,000,000).

Table results region 612 may further include a scroll bar 620 for scrolling through the table entries. As data is entered into any of the input fields noted above, display region 606 may be automatically updated to reflect such input (e.g., based on recalculation of a (new) optimal combination of DDAs via processing engine 122). For example, processing engine 122 may select (and add) a new financial institution if a financial institution is removed via selector button(s) 616 and/or may rebalancing of amounts in individual DDAs if any of the amounts are edited in editable text box(es) 614.

Screen 610 may also include a "Place Funds" button 618 to confirm acceptance of the allocation shown in display region 606.

Figure 6D:
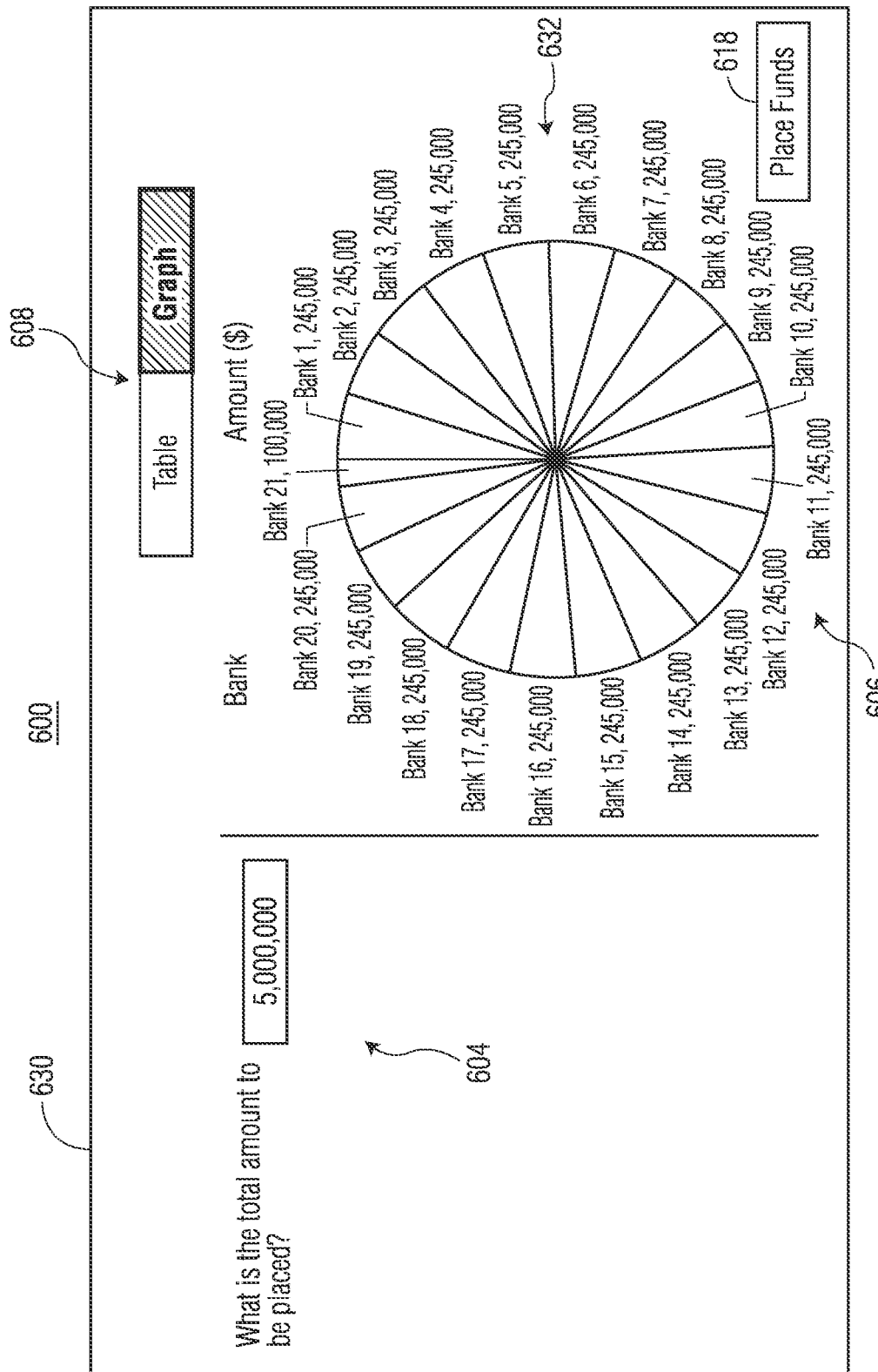

FIG. 6D illustrates an exemplary proposed DDA allocation screen 630 of MDA builder GUI 600, which may be displayed if a graphical format display option among display format selector buttons 608 is selected. Screen 630 may include graphical results region 632 in display region 606. Graphical results region 632 may display the proposed (optimized) DDAs including the financial institution(s) and allocation amounts to be funded for each in any suitable graphical format (e.g., a pie chart). In one example, financial institution(s) and individual information displayed in graphical results region 632 may be similar to the information in table results region 612 (FIG. 6B). It may be appreciated that the display of DDA allocation information in a graphical format may provide a more intuitive overview of the funding amounts, particularly as the number of financial institution(s) included in the allocation increases.

Figure 6E:
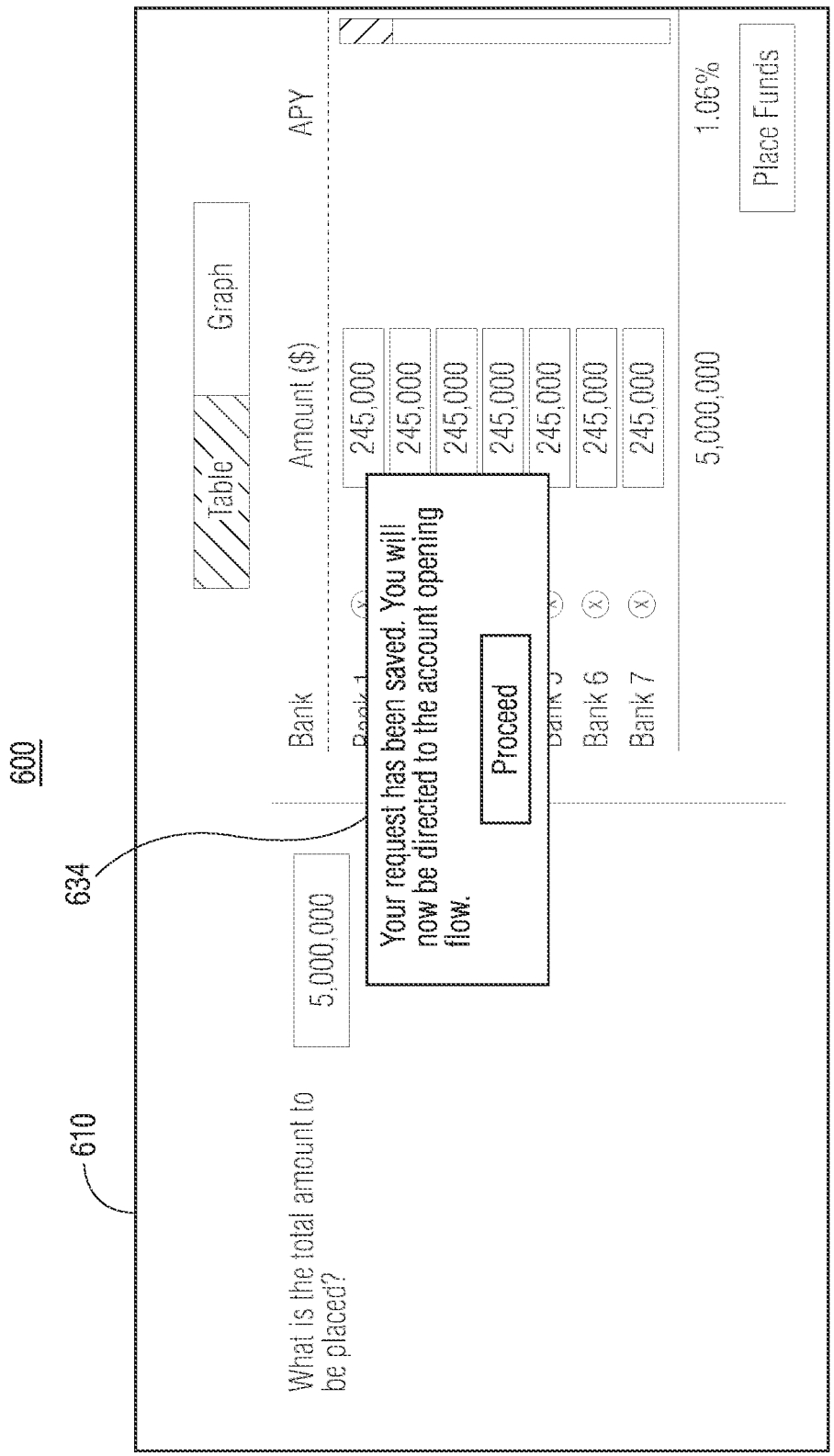

FIG. 6E illustrates an exemplary pop-up window 634 of MDA builder GUI 600 which may be displayed (e.g., over screen 610) if the user selects "Place funds" button 618 and chooses the DDA allocation shown in display region 606 in screen 610. Pop-up window 634 may include user input tools to confirm saving of the MDA characteristics/DDA allocation and opening of the MDA and DDAs in the allocation.

FIGS. 7A and 7B are example screenshots of interactive GUI 700 for dynamically creating user-customized meta-deposit account(s). In some examples, interactive GUI 700 may be part of account creation tools of MDA GUI 126 (FIG. 1) for creating user-defined MDA(s) 136 in real-time (and/or near real-time). In some examples, GUI 700 may be used by depositors (e.g., directly by users) and/or advisors (e.g., indirectly by users via at least one financial intermediary).

Interactive GUI 700 illustrates an exemplary account management screen 702 of GUI 700. Account management screen 702 may include one or more selectable tabs 704 for presenting information associated with a user (e.g., a customer), including, without being limited to, user (customer) information, contact information, funding/payment information, account information and documentation. Account management screen 702 may display account review region 706 when the "Review" tab of selectable tabs 704 is selected. In some examples, screen 702 may include scroll bar 708 for scrolling through the various displayed information of display account review region 706.

Account review region 706 may display DDA information associated with a user, such as (without being limited to) various financial institution(s) 104 (e.g., bank(s)) for which the user may have DDAs for an MDA, an allocated amount and APY for each financial institution, a total amount allocated across the financial institution(s) 104 and/or a blended APY. In some examples, individual APY data (or other particular data) may not be publicly displayed (e.g., if the data is considered to be confidential for a particular financial institution), but may be privately displayed if the user is an authorized user (e.g., for a particular bank).

Referring next to FIGS. 8A-8D, example screenshots of interactive GUI 800 (also referred to herein as MDA manager GUI 800) for dynamically managing user-customized MDA(s) are shown. In some examples, interactive GUI 800 may be part of account management tools of MDA GUI 126 (FIG. 1) for managing user-defined MDA(s) 136 in real-time (and/or near real-time). In some examples, MDA manager GUI 800 may be used by depositors (e.g., directly by users) and/or advisors (e.g., indirectly by users via at least one financial intermediary).

FIG. 8A illustrates an exemplary MDA manager screen 802 of GUI 800. Screen 802 may include account summary region 804 for displaying one or more user-defined MDAs associated with a user, for example in a list view. Account summary region 804 may display summary information for each MDA account including, for example, an account number, an account title, a start date, an original balance, a current balance, a blended APY and an accrued interest.

Account summary region 804 may also include selector tool 806 associated with each listed MDA (e.g., a toggle selector tool). Selector tool 806 may allow a user to choose between displaying summary information (as shown in account summary region 804) for each MDA and displaying detailed information on all DDAs in an individual MDA (as shown in detailed account region 812 of screen 810 shown in FIG. 8B). Screen 802 may be updated to present or hide detailed account region 812, responsive to user input via selector tool 806.

Account summary region 804 may also include management tool 808 associated with one or more management functions related to an MDA (including for each individual DDA) that can be invoked via GUI 800 (e.g., from a dropdown input tool). In some examples, management tool 808 may allow a user to perform various self-service functions including, but not limited to, functions related to DDA details, holds, early withdrawals and statements.

FIG. 8B illustrates screen 810 of GUI 800 including detailed portfolio region 812 displaying detailed information on all DDAs in an individual user-defined MDA. Screen 810 also illustrates example management tool 808.

FIG. 8C illustrates an exemplary financial institution exclusion screen 820 of GUI 800. Screen 820 may include first region 822, second region 824 and institution selector tools 826 for including and/or excluding individual financial institutions (e.g., banks) from an MDA. First region 822 may display one or more selectable eligible financial institutions associated with an MDA. Second region 824 may display any financial institutions to be excluded from an MDA. Institution selector tools 826 allow a user to select any selectable eligible financial institutions in first region 822 and move the selected financial institution(s) to second region 824, in order to exclude the selected eligible financial institution (s) from the MDA. Institution selector tools 826 may also allow a user to select excluded financial institution(s) displayed in second region 824 and move the selected excluded financial institution (s) to first region 822, for inclusion in the MDA.

FIG. 8D illustrates an exemplary revenue setting screen 830 of GUI 800. Screen 830 may include selection region 832 for providing user input for managing revenue associated with one or more accounts (e.g., MDAs and/or DDAs). Selection region 832 may allow a user (e.g., a distribution partner such as a bank, a financial intermediary, an advisor, etc.) to input a maximum revenue (e.g., via textual input), choose whether a portion of revenue is held by a relationship manager (e.g., via selector buttons) and/or input a maximum discount the relationship manager can provide to a user (e.g., via textual input). In some examples, selection region 832 may allow a user to input additional information (e.g., via a link) if revenue is different depending on tenor or some other parameter(s). In some examples, user-facing screens (e.g., for a depositor, an advisor, etc.) may display net-net-net interest rates comprising a net of any administrator fee, a net of any distribution partner fees and a net of any relationship manager discount. In an illustrative example, a blended APY offered to a depositor for a one-year strategy may be 1.06%. The blended APY may have been 1.31% without any fees (e.g., 0.15% for a distribution partner and 0.10% for an administrator fee). For a client rate of 1.06%, the client rate becomes 1.11% with a full relationship manager discount.

In some examples, the web interface(s) shown in FIGS. 5-8D may include an interface configured for a distribution partner, for facilitating client conversations in real-time. For example, a distribution partner may input its customer's desired characteristics into the web interface, such as a need for a particular demand deposit account (e.g., for $5,000,000) with full FDIC insurance. Based on the desired characteristics, the web interface(s) may automatically show eligible financial institutions (e.g., banks) selected by optimization algorithm(s) 130 and a blended APY available in real-time (e.g., in a list or graph view as shown in respective FIGS. 6B-6D). In some examples, the distribution partner may also be notified in case one of the participating banks has already received funds from an institution, as an FDIC limit might have been reached. In some examples, the web interface(s) may include one or more options for (among others) including and/or excluding one or more participating financial institutions (e.g., banks) and selecting at least interim liquidity. In some examples, the web interface(s) may provide system updates, terms and/or APYs in real-time (and/or near real-time).

Referring next to FIGS. 9A-9C, are example screenshots of DDA pricing console GUI 900 for participating deposit institutions (e.g., banks) is shown. In some examples, DDA pricing console GUI 900 may be an example of institution console GUI 128 of web interface(s) 120 (FIG. 1).

FIG. 9A illustrates an exemplary pricing console screen 902 of GUI 900 for DDA funding by administrators of financial institution(s) 104 (e.g., depository institutions such as banks, credit unions, etc.). In an example, a depository institution may include any financial institution 104 that is willing to accept deposits. Screen 902 may include selection region 904 for providing user input for funding an individual DDA. Selection region 904 may allow an administrator to input (e.g., via textual input), for each parameter (e.g., tenor), other parameters/variables, such as an APY (e.g., how much the depository institutions is willing to pay), a minimum individual DDA balance and a maximum combined DDA balances. Screen 902 may also include display region 906 that displays capacity information for each term (e.g., how much total allowed capacity for each term has been fulfilled and how much capacity is remaining). The capacity information may be determined by MDA server(s) 102 based on the user input in screen 902 (e.g., as input in selection region 904).

FIG. 9B illustrates an exemplary MD balance breakdown report screen 910 of GUI 900. Report screen 910 may be used by an administrator (e.g., a treasury department) of financial institution(s) 104 (e.g., depository institutions such as banks, credit unions, etc.) for reviewing details for all issued deposits in one single location (e.g., screen 910). Screen 910 may include display region 912 to provide a MD balance breakdown for depositors. Display region 912 may display details including (without limit) account number, opening date, outstanding balance, remaining capacity, current APY and year-to-date (YTD) accrued interest. Remaining capacity refers to a total dollar amount that any given financial institution is still willing to accept from one or more depositors. For example, if a financial institution (e.g., a bank) is willing to accept one million dollars and a depositor deposits 500,000 dollars, the bank may only subsequently accept another 500,000 dollars. In some examples, display region 912 may include selector tool 914 (e.g., a toggle tool) if the information for a given DDA include more than one depositor (e.g., "Various"). Selector tool 914 may allow an administrator to display either an overview of the MD balance or details of the MD balance by individual depositor.

FIG. 9C illustrates an exemplary detailed MD balance breakdown report screen 920 of GUI 900, which may be displayed if selector tool 914 (in FIG. 9B) is selected. Screen 920 may include detailed display region 922 for displaying deposit information (similar to the information presented in display region 912 of FIG. 9B) for all individually issued deposits.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through a network or wireless links. Computers may also comprise of software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, an on-site computing device specially configured for a particular entity, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the real-time data account allocation and management systems and methods described herein, such as, for example, any public and/or private networks, including, for instance, the interne, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 10 illustrates a functional block diagram of a machine in the example form of computer system 1000 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of AAM server(s) 102 (middleware engine 110, security management system 112, data monitor 114, MD account database(s) 116, web interface(s) 118, processing engine 122 and/or automated lifecycle processing system 122), financial institution(s) 104, user device(s) 106 and/or funding service(s) 108 may be implemented by a specialized machine, particularly programmed to perform certain functions, such as the example machine shown in FIG. 10 (or a combination of two or more of such machines).

Example computer system 1000 may include processing device 1002, memory 1006, data storage device 1010 and communication interface 1012, which may communicate with each other via data and control bus 1018. In some examples, computer system 1000 may also include display device 1014 and/or user interface 1016.

Processing device 1002 may include, without being limited to, a microprocessor, a central processing unit, an application-specific integrated circuit (ASIC), a field programmable gate array (FPGA), a digital signal processor (DSP) and/or a network processor. Processing device 1002 may be configured to execute processing logic 1004 for performing the operations described herein. Processing device 1002 may include a special-purpose processing device specially programmed with processing logic 1004 to perform the operations described herein.

Memory 1006 may include, for example, without being limited to, at least one of a read-only memory (ROM), a random access memory (RAM), a flash memory, a dynamic RAM (DRAM) and a static RAM (SRAM), storing computer-readable instructions 1008 executable by processing device 1002. Memory 1006 may include a non-transitory computer readable storage medium storing computer-readable instructions 1008 executable by processing device 1002 for performing the operations described herein. For example, computer-readable instructions 1008 may include operations performed by components 110-122 of AAM server(s) 102, including operations shown in FIGS. 3 and 4. Although one memory device 1006 is illustrated in FIG. 10, in some examples, computer system 1000 may include two or more memory devices (e.g., dynamic memory and static memory).

Computer system 1000 may include communication interface device 1012, for direct communication with other computers (including wired and/or wireless communication) and/or for communication with a network. In some examples, computer system 1000 may include display device 1014 (e.g., a liquid crystal display (LCD), a touch sensitive display, etc.). In some examples, computer system 1000 may include user interface 1016 (e.g., an alphanumeric input device, a cursor control device, etc.).

In some examples, computer system 1000 may include data storage device 1010 storing instructions (e.g., software) for performing any one or more of the functions described herein. Data storage device 1010 may include a non-transitory computer-readable storage medium, including, without being limited to, solid-state memories, optical media and magnetic media.

While the present disclosure has been discussed in terms of certain embodiments, it should be qualified that the present disclosure is not so limited. The embodiments are explained herein by way of example, but there are numerous modifications, variations and other embodiments that may be employed that would still be within the scope of the present disclosure.

The invention claimed is:

1. A system comprising:
a plurality of financial entity systems;
at least one user device; and
at least one computer server configured to communicate with the plurality of financial entity systems and the at least one user device via at least one communication network, the at least one computer server configured to:
generate an interactive web interface on a display of the at least one user device, the interactive web interface comprising one or more screens configured to display an account creation tool including one or more user input tools for creating a user-defined first electronic account;
receive, from the at least one user device via the interactive web interface, at least one user input indication via the one or more user input tools;
continually monitor, by a data monitor of the at least one computer server, account condition data from among the plurality of financial entity systems;
determine, via an optimization engine of the at least one computer server, a combination comprising a plurality of second electronic accounts selected from among the plurality of financial entity systems, based on the monitored account condition data and the at least one user input indication, such that an aggregate characteristic of the combination satisfies the at least one user input indication,
wherein the plurality of second electronic accounts comprises a plurality of demand deposit accounts and wherein the combination further indicates funding amounts for each of the plurality of demand deposit accounts;
display, via the interactive web interface, on the account creation tool, the combination and its aggregate characteristic;
receive, from the at least one user device via the interactive web interface, input comprising a confirmation indication;

create, responsive to the confirmation indication via the optimization engine, the user-defined first electronic account comprising the plurality of second electronic accounts and having one or more capabilities that are not available to the plurality of second electronic accounts individually, said create comprising:
generate and transmit at least one communication to at least one financial entity system among the plurality of financial entity systems, the at least one communication including one or more instructions to initiate an opening of at least one of the plurality of second electronic accounts, and
in response to the one or more instructions, each of said at least one financial entity system among the plurality of financial entity systems initiating the opening of the at least one of the plurality of second electronic accounts according to its respective opening process; and
responsive to detecting a change in the monitored account condition data, automatically rebalance, by the optimization engine, one or more accounts among the plurality of second electronic accounts in accordance with the detected change.

2. The system of claim 1, wherein the optimization engine is configured to automatically rebalance one or more among the plurality of second accounts responsive to detecting at least one user input indicative of an adjustment to one or more of the user-defined first electronic account post-confirmation and one or more among the plurality of second electronic accounts post-confirmation.

3. The system of claim 1, wherein the plurality of second electronic accounts are stored among the plurality of financial entity systems and the user-defined first electronic account is stored on the at least one computer server.

4. The system of claim 1, wherein the one or more user input tools includes one or more user adjustment tools for adjusting at least one characteristic that comprises the aggregate characteristic of the combination displayed via the interactive web interface.

5. The system of claim 4, wherein the one or more user adjustment tools include user input options for one or more of excluding at least one among the plurality of financial entity systems and altering at least one funding amount among the funding amounts indicated in the combination.

6. The system of claim 4, wherein:
the optimization engine is configured, responsive to further user input via the one or more user adjustment tools, to recalculate the plurality of second electronic accounts based on the further user input and the monitored account condition data, and
the interactive web interface is configured to display the recalculated plurality of second electronic accounts on the at least one user device.

7. The system of claim 1, wherein the optimization engine is configured to automatically rebalance the one or more accounts without user input.

8. The system of claim 1, wherein the interactive web interface includes one or more account management tools for managing the user-defined first electronic account post-confirmation, the one or more account management tools including one or more of withdrawal tools, fund addition tools, and financial entity system adjustment tools.

9. The system of claim 1, wherein the at least one computer server is configured to generate an interactive console interface on at least one among the plurality of financial entity systems, the interactive console including one or more management tools for managing individual ones among the plurality of second electronic accounts.

10. The system of claim 1, wherein the user-defined first electronic account comprises a meta-deposit account.

11. The system of claim 10, wherein the account condition data comprises one or more of at least one annual percentage yield, a maximum demand deposit funding amount and a minimum demand deposit funding amount.

12. The system of claim 10, wherein the at least one user input indication includes a total funding amount for the meta-deposit account.

13. The system of claim 10, wherein the aggregate characteristic includes one or more of an annual percentage yield, a blended annual percentage yield and a funding amount for each of the plurality of demand deposit accounts.

14. The system of claim 10, wherein the at least one computer server further comprises an automated data handling system configured to automatically initiate and execute one or more lifecycle routines post-confirmation of the meta-deposit account.

15. The system of claim 14, wherein the one or more lifecycle routines include one or more of opening the plurality of demand deposit accounts with the plurality of financial entity systems, performing funding of the plurality of demand deposit accounts across one or more funding systems, conducting one or more withdrawals, conducting one or more funding transfers, conducting one or more settlements, generating general ledger entries, conducting one or more interest accruals, data storage, generating regulatory and fiscal reports, generating one or more account statements, generating one or more automated notifications of a current status of the meta-deposit account, generating one or more electronic files, and generating one or more processing actions for further downstream processing.

16. A method, the method comprising:
generating, via at least one computer server, an interactive web interface on a display of at least one user device, the interactive web interface comprising one or more screens configured to display an account creation tool including one or more user input tools for creating a user-defined first electronic account;
receiving, from the at least one user device, via the interactive web interface, at least one user input indication via the one or more user input tools;
continually monitoring, by a data monitor of the at least one computer server, account condition data from among a plurality of financial entity systems, the at least one computer server configured to communicate with the plurality of financial entity systems and the at least one user device via at least one communication network;
determining, via an optimization engine of the at least one computer server, a combination comprising a plurality of second electronic accounts selected from among the plurality of financial entity systems, based on the monitored account condition data and the at least one user input indication, such that an aggregate characteristic of the combination satisfies the at least one user input indication,
wherein the plurality of second electronic accounts comprises a plurality of demand deposit accounts and wherein the combination further indicates funding amounts for each of the plurality of demand deposit accounts;
displaying, via the interactive web interface, on the account creation tool, the combination and its aggregate characteristic;

receiving, from the at least one user device via the interactive web interface, input comprising a confirmation indication;

creating, responsive to the confirmation indication via the optimization engine, the user-defined first electronic account comprising the plurality of second electronic accounts and having one or more capabilities that are not available to the plurality of second electronic accounts individually, said creating comprising:

generating and transmitting at least one communication to at least one financial entity system among the plurality of financial entity systems, the at least one communication including one or more instructions to initiate an opening of at least one of the plurality of second electronic accounts, and in response to the one or more instructions, each of said at least one financial entity system among the plurality of financial entity systems initiating the opening of the at least one of the plurality of second electronic accounts according to its respective opening process; and responsive to detecting a change in the monitored account condition data among the plurality of financial entity systems, automatically rebalancing, by the optimization engine, one or more accounts among the plurality of second electronic accounts in accordance with the detected change.

17. The method of claim 16, the method further comprising:

automatically rebalancing, via the optimization engine, one or more among the plurality of second accounts responsive to detecting at least one user input indicative of an adjustment to one or more of the user-defined first electronic account post-confirmation and one or more among the plurality of second electronic accounts post-confirmation.

18. The method of claim 16, wherein the one or more user input tools includes one or more user adjustment tools for adjusting at least one characteristic that comprises the aggregate characteristic of the combination displayed via the interactive web interface.

19. The method of claim 18, wherein the one or more user adjustment tools include user input options for one or more of excluding at least one among the plurality of financial entity systems and altering at least one funding amount among the funding amounts indicated in the combination.

20. The method of claim 18, the method further comprising recalculating, by the optimization engine, responsive to further user input via the one or more user adjustment tools, the plurality of second electronic accounts based on the further user input and the monitored account condition data; and displaying, via the interactive web interface, the recalculated plurality of second electronic accounts on the at least one user device.

21. The method of claim 16, the method further comprising:

automatically rebalancing, via the optimization engine, the one or more accounts without user input.

22. The method of claim 16, the method further comprising:

displaying, via the interactive web interface, one or more account management tools for managing the user-defined first electronic account post-confirmation, the one or more account management tools including one or more of withdrawal tools, fund addition tools, and financial entity system adjustment tools.

23. The method of claim 16, the method further comprising:

generating, via the at least one computer server, an interactive console interface on at least one among the plurality of financial entity systems, the interactive console including one or more management tools for managing individual ones among the plurality of second electronic accounts.

24. The method of claim 16, wherein the user-defined first electronic account comprises a meta-deposit account.

25. The method of claim 24, wherein the account condition data comprises one or more of at least one annual percentage yield, a maximum demand deposit funding amount and a minimum demand deposit funding amount.

26. The method of claim 24, wherein the at least one user input indication includes a total funding amount for the meta-deposit account.

27. The method of claim 24, wherein the aggregate characteristic includes one or more of an annual percentage yield, a blended annual percentage yield and a funding amount for each of the plurality of demand deposit accounts.

28. The method of claim 24, the method further comprising:

automatically initiating and executing, via an automated data handling system of the at least one computer server, one or more lifecycle routines post-confirmation of the meta-deposit account.

29. The method of claim 28, wherein the one or more lifecycle routines include one or more of opening the plurality of demand deposit accounts with the plurality of financial entity systems, performing funding of the plurality of demand deposit accounts across one or more funding systems, conducting one or more withdrawals, conducting one or more funding transfers, conducting one or more settlements, generating general ledger entries, conducting one or more interest accruals, data storage, generating regulatory and fiscal reports, generating one or more account statements, generating one or more automated notifications of a current status of the meta-deposit account, generating one or more electronic files, and generating one or more processing actions for further downstream processing.

30. A non-transitory computer readable medium storing computer readable instructions that, when executed by one or more processing devices, cause the one or more processing devices to perform the functions of:

generating an interactive web interface on a display of at least one user device, the interactive web interface comprising one or more screens configured to display an account creation tool including one or more user input tools for creating a user-defined first electronic account;

receiving, from the at least one user device, via the interactive web interface, at least one user input indication via the one or more user input tools;

continually monitoring, via at least one communication network, account condition data from among a plurality of financial entity systems;

determining a combination comprising a plurality of second electronic accounts selected from among the plurality of financial entity systems, based on the monitored account condition data and the at least one user input indication, such that an aggregate characteristic of the combination satisfies the at least one user input indication, wherein the plurality of second electronic accounts comprises a plurality of demand deposit accounts and wherein the combination further indicates funding amounts for each of the plurality of demand deposit accounts;

displaying, via the interactive web interface, on the account creation tool, the combination and its aggregate characteristic;

receiving, from the at least one user device via the interactive web interface, input comprising a confirmation indication;

creating, responsive to the confirmation indication, the user-defined first electronic account comprising the plurality of second electronic accounts and having one or more capabilities that are not available to the plurality of second electronic accounts individually, said creating comprising:

generating and transmitting at least one communication to at least one financial entity system among the plurality of financial entity systems, the at least one communication including one or more instructions to initiate an opening of at least one of the plurality of second electronic accounts, and in response to the one or more instructions, each of said at least one financial entity system among the plurality of financial entity systems initiating the opening of the at least one of the plurality of second electronic accounts according to its respective opening process; and responsive to detecting a change in the monitored account condition data among the plurality of financial entity systems, automatically rebalancing one or more accounts among the plurality of second electronic accounts in accordance with the detected change.

\* \* \* \* \*